(12) United States Patent
Murdoch et al.

(10) Patent No.: US 10,185,912 B2
(45) Date of Patent: Jan. 22, 2019

(54) RFID EXTENDED OPERATION RANGE SYSTEM, APPARATUS AND METHOD

(71) Applicant: SATO HOLDINGS KABUSHIKI KAISHA, Tokyo (JP)

(72) Inventors: Graham Alexander Munro Murdoch, Annandale (AU); Stuart Colin Littlechild, Annandale (AU)

(73) Assignee: SATO HOLDINGS CORPORATION, Tokyo (JP)

( * ) Notice: Subject to any disclaimer, the term of this patent is extended or adjusted under 35 U.S.C. 154(b) by 0 days.

(21) Appl. No.: 15/509,440

(22) PCT Filed: Sep. 11, 2015

(86) PCT No.: PCT/JP2015/004635
§ 371 (c)(1),
(2) Date: Mar. 7, 2017

(87) PCT Pub. No.: WO2016/038897
PCT Pub. Date: Mar. 17, 2016

(65) Prior Publication Data
US 2017/0255856 A1   Sep. 7, 2017

(30) Foreign Application Priority Data
Sep. 12, 2014   (AU) .............................. 2014903643

(51) Int. Cl.
*G06K 19/077*   (2006.01)
*G06K 19/07*   (2006.01)
*G06K 7/10*   (2006.01)

(52) U.S. Cl.
CPC ... *G06K 19/07773* (2013.01); *G06K 7/10178* (2013.01); *G06K 19/0726* (2013.01); *G06K 19/07794* (2013.01); *G06K 19/07796* (2013.01)

(58) Field of Classification Search
CPC ....... G06K 19/07773; G06K 19/07794; G06K 19/07779
(Continued)

(56) References Cited

U.S. PATENT DOCUMENTS 4,546,241 A   10/1985 Walton
5,153,583 A   10/1992 Murdoch
(Continued)

FOREIGN PATENT DOCUMENTS

AU   2013201425 A1   1/2014
JP   2001-24548 A   1/2001
(Continued)

OTHER PUBLICATIONS

International Search Report dated Dec. 22, 2015, issued in counterpart application No. PCT/JP2015/004635. (4 pages).
(Continued)

*Primary Examiner* — Paultep Savusdiphol
(74) *Attorney, Agent, or Firm* — Westerman, Hattori, Daniels & Adrian, LLP

(57) ABSTRACT

The problem to solve is how to extend the operating range of small stackable RFID tags when they are placed in an undesirable orientation. Disclosed is an RFID tag that operates in two modes whereby in a first mode the tag has a short range and in a second mode the tag has a long range. The tag is converted from the first mode short range device into the second mode long range device by placing it close to a coupling device. That is in the second mode the tag becomes a two part RFID tag system (1400) capable of communicating with an interrogator antenna (1407).

14 Claims, 27 Drawing Sheets

(58) Field of Classification Search
USPC .................................................. 235/487, 492
See application file for complete search history.

(56) References Cited

U.S. PATENT DOCUMENTS

| | | | |
|---|---|---|---|
| 5,258,766 | A | 11/1993 | Murdoch |
| 5,302,954 | A | 4/1994 | Brooks et al. |
| 5,517,194 | A | 5/1996 | Carroll et al. |
| 5,550,536 | A | 8/1996 | Flaxl |
| 6,172,608 | B1 | 1/2001 | Cole |
| 6,837,438 | B1* | 1/2005 | Takasugi ............ G06K 19/0723 235/492 |
| 7,374,105 | B2 | 5/2008 | Zhu et al. |
| 2009/0289773 | A1 | 11/2009 | Hoyt et al. |
| 2009/0315680 | A1* | 12/2009 | Arimura .......... G06K 19/07749 340/10.1 |
| 2011/0139877 | A1* | 6/2011 | Szakelyhidi ..... G06K 19/07749 235/492 |
| 2013/0233923 | A1* | 9/2013 | Hoyt ....................... H04Q 9/00 235/439 |
| 2014/0378051 | A1* | 12/2014 | Charrat ............ G06K 19/07769 455/41.1 |
| 2015/0235063 | A1* | 8/2015 | Loussert ............ G06K 7/10316 340/10.1 |

FOREIGN PATENT DOCUMENTS

| | | |
|---|---|---|
| JP | 2005-184424 A | 7/2005 |
| WO | 1996/002954 A1 | 2/1996 |
| WO | 1999/034526 A1 | 7/1999 |
| WO | 2004/019055 A1 | 3/2004 |
| WO | 2007/030861 A1 | 3/2007 |
| WO | 2007/142645 A1 | 12/2007 |
| WO | 2009/149506 A1 | 12/2009 |
| WO | 2014/033626 A1 | 3/2014 |

OTHER PUBLICATIONS

Written Opinion dated Dec. 22, 2015, issued in counterpart application No. PCT/JP2015/004635. (4 pages).

* cited by examiner $$B = B_0 \left( \frac{3u_r}{u_r + 2} \right)$$

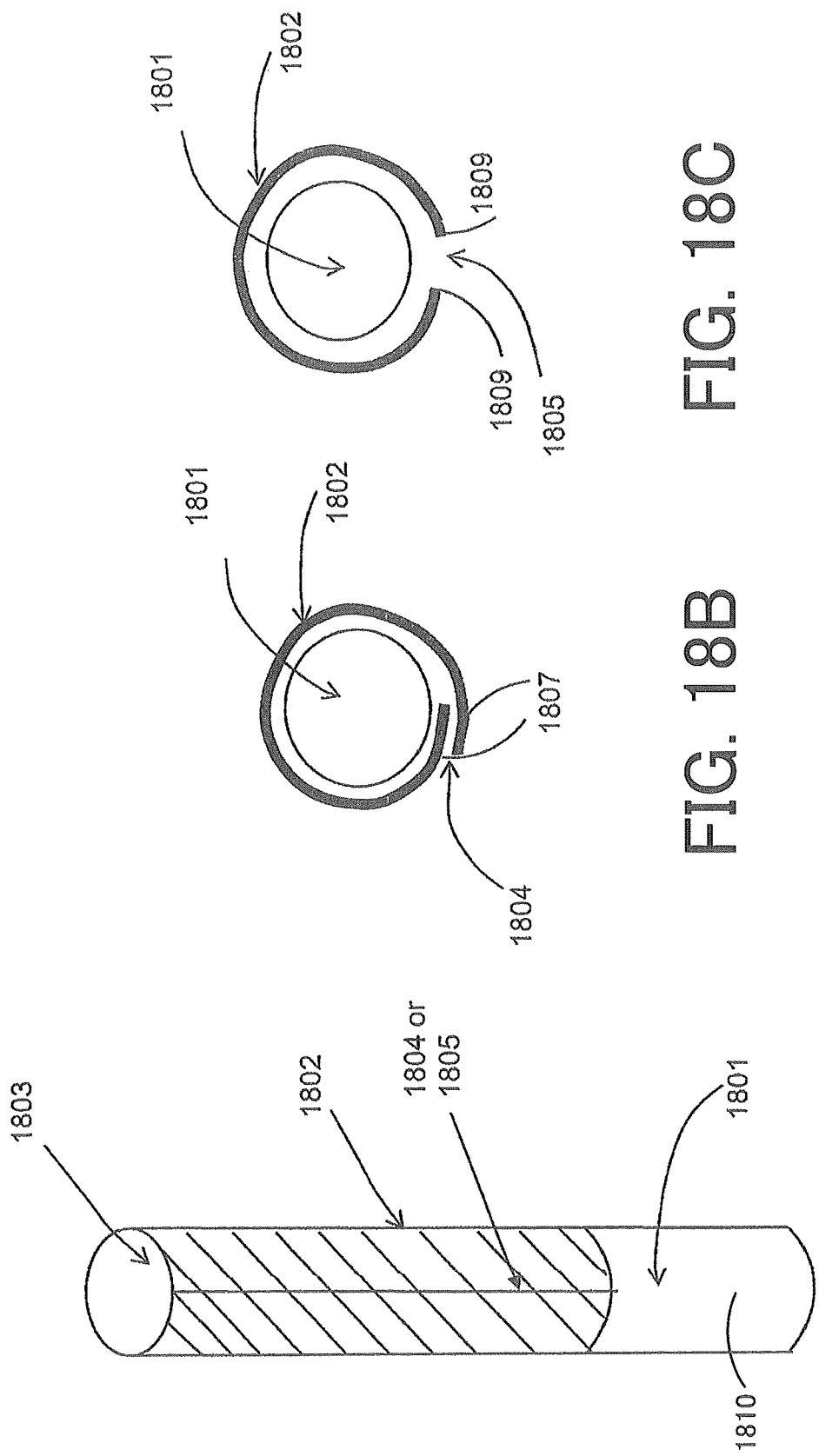

RFID EXTENDED OPERATION RANGE SYSTEM, APPARATUS AND METHOD

CROSS-REFERENCE TO RELATED APPLICATIONS

This application is a national phase application under 35 U.S.C. § 371 of International Application No PCT/JP2015/004635 filed 11 Sep. 2015, which claims the benefit of Australian Provisional Patent Application No 2014903643 filed on 12 Sep. 2014, the contents of which are incorporated herein by reference in their entirety.

TECHNICAL FIELD

The present invention relates to the field of radio frequency identification (RFID).

In one form, the invention relates to system, device, and/or method used in association with the field of identification, such as Radio Frequency Identification or RFID. The invention has application in interrogating an active and/or passive transponder which is associated with an object to be identified and which will be described hereinafter with reference to that application. A specific, non-limiting, application is the identification of RFID transponders or other RFID devices, such as those attached to items, such as jewelry items, or embedded in plastic tokens or cards that are both stacked on each other for logistical and storage purposes and placed individually on shelving for display purposes.

It will be convenient to hereinafter describe the invention in relation to identification of RFID transponders placed in cabinets or on shelves for display purposes; however, it should be appreciated that the present invention is not limited to that use only.

BACKGROUND ART

The discussion throughout this specification comes about due to the realisation of the inventor.

There are applications which mandate a small sized label for identification and/or pricing purposes. These labels are typically printed and/or handwritten. The identification and processing of these labels is done manually which is both time consuming and prone to error. Often the labelled items are both stacked on each other for logistical and storage purposes and placed individually on shelving for display purposes.

By way of example only, one such application according to the present invention is jewelry where labels attached to jewelry for identification and tracking must be very small in size. FIG. 1 illustrates a ring 101 as an example jewelry item which has been tagged with or strapped to a small label 103. Typically the label 103 has product information and pricing information printed or written on it.

When displayed, the jewelry items (with their associated labels) are placed in preset locations for optimum viewing. Each jewelry item is placed on an individual display stand or in a unique slot on a display tray for aesthetic viewing. The label, with pricing information, is inserted into special pockets or cavities in the stand or tray to put it out of sight.

By way of example only, according to the present invention, FIG. 2A illustrates a display assembly 200, which includes a display unit, such as a ring mount 201, used for displaying a ring 101. The ring 101 is pressed into a slot or pocket 202 on the ring mount 201 for easy or aesthetic viewing. FIG. 2B illustrates the ring mount 201 in cross section view 204. The ring 101 and the ring's label 103 are pressed into the pocket 202. The label 103 is pressed deeper to the bottom of the pocket in order to be out of sight. FIG. 3 illustrates an example of a display tray 302 used for supporting and displaying ring mounts 201. The tray 302 is placed in a display case for viewing and rests on the display case floor 301.

FIG. 4A illustrates another example of a display assembly 400 having a display unit, such as a ring display tray 401, used for displaying multiple rings 101. The rings 101 are inserted into pockets 402 on the tray 401 for easy viewing. FIG. 4B illustrates the ring mount 401 in cross section view 403. The rings 101 and the ring labels' 103 are pressed into the pocket 402. The label 103 is pressed deeper to the bottom of the pockets 402, in order to be out of sight, and lie flat on the base of the tray 401. The display tray 401 is placed in a display case for viewing and rests on the display case floor 301.

FIG. 5A illustrates another example of a display assembly 500 having a display unit, such as a necklace stand 501, used for displaying a high value necklace 502. FIG. 5B illustrates a cross sectional view 504 of the necklace stand 501. Excess chain of the necklace 502 is placed in a pocket 503 at the back top of the stand 501 and the necklace's label 103 that is strapped to the necklace 502 is placed in a separate pocket 506 also at the back top of the stand 501. The stand 501 is placed in a display case (referenced later in description) for viewing, and the stand 501 rests on the display case floor 301.

FIGS. 6A and 6B illustrate another example of a display assembly 600 having a display unit, such as display cabinets 601, with various mounts 201, trays 302 & 401 and stands 501 for jewelry items 101 & 502. The various mounts 201, trays 302 & 401 and stands 501 rest on the floor 301 of the cabinets 601. The various jewelry items 101 & 502 are viewed through a transparent top 603. An interrogation antenna 604 is typically located under floor 301, as will be described later herein.

FIG. 6C illustrates an example process flow for a jewelry business. At jewelry factories 605 items of jewelry 607 are made by jewelers, craftsmen or machines 606. These items have printed labels 103 (not shown) and are packed in bulk into transport boxes 608 and are transported to a storage and distribution facility 614. Upon arrival they are unpacked, checked, counted and sorted into bulk storage 609. Upon receipt of orders from jewelry stores 615 the ordered items 610 are picked from the storage bins 609, checked, counted and packed into bulk transport boxes 611 for despatch to the jewelry stores 615. When the transport boxes 611 arrive at the jewelry stores 615 they are unpacked, checked, counted and placed in storage 613 inside a secure vault 612. Jewelry items 607 are moved from the secure storage 612 to be individually displayed in display cabinets 601.

In considering applications of RFID technology in jewelry manufacture, warehousing and/or retail sales, the inventors have realised that many of the label locations and orientations in jewelry mounts, trays and stands are considered undesirable for reliable RFID tag operation. For example, referring to FIGS. 6A and 6B, in particular, the tags are either too far removed from the display floor 301, where the interrogator antennas would be located or poorly oriented to collect sufficient interrogation field. The inventors have also realised that any RFID tag applied to jewelry must be stackable to enable the bulk identification of tagged jewelry during manufacturing and warehousing and at other times when two or more tagged items are close together.

The inventors have realised that relatively small stackable RFID tags have limited application when placed individually on shelving for display purposes due to the distance and/or orientation between the RFID tag and an associated interrogator antenna.

The inventors have also realised that there is a need to address the operating range of small stackable RFID tags when they are placed on display in the pre-set locations and in an undesirable orientation, and for example, relatively small items such as jewelry. The inventors have also realised that the individual display stands and the display trays (in jewelry applications) are moveable and any solution would need to work regardless of the position of the display mount, stand or tray in the display cabinet.

The inventors have also realised that a resonant RFID tag antenna cannot be used in stacking situations or in close proximity to other tags because when brought close together for bulk handling, resonant RFID tags will parasitically couple together.

The inventor is aware of the disclosure of US2009/0289773 A1 in which the stacking height of stackable tags is increased by including a ferrite core in the centre of each tag. When stacked, these cores line up creating a column of ferrite and thereby conducting the excitation field from the bottom of the stack up to the tags at the top of the stack. This disclosure however has limited practical application as the multiple tags need to be precisely stacked on top of each other, there are operational limits to the height or the number of tags which can be stacked as each tag added to the stack consumes some of the field required by tags placed further up the stack and each tag includes a ferrite core which is considered to be expensive, thick and heavy compared to a tag without any ferrite core material.

The inventor is aware of the disclosure of U.S. Pat. No. 6,172,608 in which the coupling to a small RFID tag is improved by adding a larger parasitic antenna, also known as an auxiliary antenna, attached to the item being identified. The item being identified is much bigger than the tag and the auxiliary antenna is again much bigger than the tag antenna. In the case of U.S. Pat. No. 6,172,608 the items beings identified are bales. The auxiliary antenna is built into the bale strap and the tag is incorporated into the strap buckle. This is advantageous when the interrogator antenna is small and upon being moved close to the bale the interrogation signal couples into the parasitic antenna. In antenna terms the parasitic (or auxiliary antenna) becomes an extension of the interrogator antenna extending its size and reach to the smaller RFID tag. This disclosure however is not considered suitable for applications where the tag is attached to relatively small items as it relies on the auxiliary antenna having an area larger than the RFID tag in order to collect more of the interrogation field. Often relatively smaller items have a strict size limit on any associated tag or label and thus any additional auxiliary antenna is often to be avoided or cannot be larger than the RFID tag.

The inventor is aware of the disclosure of U.S. Pat. No. 7,374,105 in which an RFID tag is made using one or more concentric tuned antenna coils with the centrally located RFID chip coupled to the tuned coil(s) using a small untuned coil. The disclosed construction shows that the high mechanical precision required for working with the very small RFID chip is only required for the chip and its small coil. The remainder of the tag's much larger tuned coil(s) can be manufactured using much less stringent mechanical tolerances. However, a resonant RFID tag antenna is not considered suitable for bulk processing or storage as resonant RFID tags will parasitically couple together and thus cannot work stacked.

It should be noted that throughout this specification the use of the word "inventor" in singular form may be taken as reference to one (singular) inventor as or more than one (plural) inventors of the present invention.

It is to be appreciated that any discussion of documents, devices, acts or knowledge in this specification is included to explain the context of the present invention. Further, the discussion throughout this specification comes about due to the realisation of the inventor and/or the identification of certain related art problems by the inventor. Moreover, any discussion of material such as documents, devices, acts or knowledge in this specification is included to explain the context of the invention in terms of the inventor's knowledge and experience and, accordingly, any such discussion should not be taken as an admission that any of the material forms part of the prior art base or the common general knowledge in the relevant art in Australia, or elsewhere, on or before the priority date of the disclosure and claims herein.

SUMMARY OF INVENTION

An object of the present invention is to provide an improved RFID tag.

It is another object of the embodiments described herein to overcome or alleviate at least one of the above noted drawbacks of related art systems or to at least provide a useful alternative to related art systems.

In a first aspect of embodiments described herein, there is provided an improved RFID tag that operates in two modes whereby in a first mode the RFID tag has a short range S and in a second mode the RFID tag has an extended (longer) range E, where E>S. The tag being converted or modified in operation from the first mode being a relatively short range device into the second mode being a relatively long range device.

Preferably, in a first aspect of embodiments described herein, the tag operates in a first mode of operation as a relatively short range device, and in a second mode of operation as a relatively long range device, the tag operates by coupling with a coupling device which is designed to enhance the coupling between an interrogator antenna and the RFID tag.

The present invention has application to multiple and/or a wide variety of tag(s), such as, but not limited to tag(s) that operate at any one or any combination of suitable frequencies. Suitable examples of such tags may include, but are not limited to, the recognised RFID frequency band(s), that is Low Frequency (LF), High Frequency (HF), Ultra High Frequency (UHF) or Super High Frequency (SHF), for example:

1. LF: 125 kHz-134.2 kHz: low frequencies,
2. HF: 13.56 MHz: high frequencies,
3. UHF: 860 MHz-960 MHz and 2.45 GHz: ultra-high frequencies, and
4. SHF: 5.8 GHz: super high frequencies.

In a second aspect of embodiments described herein, there is provided an improved RFID tag that operates in two modes whereby in a first mode the RFID tag has at least one RFID tag adapted to be stackable, and a second mode wherein the RFID tag has two parts, a first part having at least one RFID tag adapted to be stackable, and at least one second part operably associated to the first part for the purpose of extending range of the tag and/or enhancing interrogation. The at least one second part is a Coupling Device which is adapted to enhance the coupling between the interrogator antenna and the stackable RFID tag for the purpose of interrogation, especially when the stackable RFID tag and the Coupling Device are moved proximate to each other for the purpose of interrogation.

In a third aspect of embodiments described herein, the second part Coupling Device includes ferrite rod or rods oriented along the axis of the RFID tag to amplify the local field near the RFID tag and direct the said field through the RFID tag for the purpose of interrogation, and especially when the RFID tag and the Coupling Device are moved proximate to each other for the purpose of interrogation.

In a fourth aspect of embodiments described herein, the second part Coupling Device includes a ferrite rod for directing the interrogator's field from a region close to the interrogator's antenna to the RFID tag located further away from the antenna for the purpose of interrogation, especially when the RFID tag and the Coupling Device are moved proximate to each other for the purpose of interrogation.

In a fifth aspect of embodiments described herein, the second part Coupling Device includes a ferrite rod for directing the interrogator's field from a region close to the interrogator's antenna up to the RFID tag located further away from the antenna, where in the ferrite rod changes the field direction to better align with the orientation of RFID tag.

In a sixth aspect of embodiments described herein, the second part Coupling Device includes a ferrite rod covered with a metal screen for directing the interrogator's field from a region close to the interrogator's antenna up to the RFID tag located further away from the antenna for the purpose of interrogation, especially when the RFID tag and the Coupling Device are moved proximate to each other for the purpose of interrogation.

In a seventh aspect of embodiments described herein, the second part Coupling Device includes a ferrite rod covered with a metal screen for directing the interrogator's field from a region close to the interrogator's antenna to the RFID tag located further away from the antenna, where in the metal covered (screened) ferrite rod changes the field direction to better align with the orientation of RFID tag.

In an eighth aspect of embodiments described herein, in the first mode the tag is untuned, and in the second mode, the tag and the Coupling Device operates as a tuned circuit to amplify the local field near the RFID tag for the purpose of interrogation, especially when the RFID tag and the Coupling Device are moved proximate to each other for the purpose of interrogation.

In a ninth aspect of embodiments described herein, the second part Coupling Device includes a tuned circuit for capturing the interrogation field over a relatively large area and to amplify the local field near the RFID tag for the purpose of interrogation, especially when the RFID tag and the Coupling Device are moved proximate to each other for the purpose of interrogation.

In a tenth aspect of embodiments described herein, the second part Coupling Device includes a combination of two or more of any of the third, fourth, fifth, sixth, seventh, eighth or ninth embodiments where in the coupling of the interrogation field to the RFID tag is enhanced for the purpose of interrogation, especially when the RFID tag and the Coupling Device are moved proximate to each other for the purpose of interrogation.

In an eleventh aspect of embodiments described herein, the second part Coupling Device includes a combination of two, three or more of any of the third, fourth, fifth, sixth, seventh, eighth or ninth embodiments where in the coupling of the interrogation field to the RFID tag is enhanced for the purpose of interrogation, especially when the RFID tag and the Coupling Device are moved proximate to each other for the purpose of interrogation.

In a twelfth aspect of embodiments described herein, the second part Coupling Device includes a combination of a ferrite rod covered with a metal screen for directing the interrogator's field from a region close to the interrogator's antenna to the RFID tag located further away from the antenna and includes a tuned circuit for amplifying the field at the tag, where in the coupling of the interrogation field to the RFID tag is enhanced for the purpose of interrogation, especially when the RFID tag and the Coupling Device are moved proximate to each other for the purpose of interrogation.

In a thirteenth aspect of embodiments described herein, the second part Coupling Device includes a combination of a ferrite rod covered with a metal screen for directing the interrogator's field from a region close to the interrogator's antenna to the RFID tag located further away from the antenna and includes a tuned circuit for amplifying the field inside the ferrite rod, where in the coupling of the interrogation field to the RFID tag is enhanced for the purpose of interrogation, especially when the RFID tag and the Coupling Device are moved proximate to each other for the purpose of interrogation.

In a fourteenth aspect of embodiments described herein, the second part Coupling Device includes a combination of a ferrite rod covered with a metal screen for directing the interrogator's field from a region close to the interrogator's antenna to the RFID tag located further away from the antenna and includes a tuned circuit for amplifying the field inside the ferrite rod, where in the tuned circuit includes a coil wound on the screened ferrite rod, thereby enhancing the coupling of the interrogation field to the RFID tag for the purpose of interrogation, especially when the RFID tag and the Coupling Device are moved proximate to each other for the purpose of interrogation.

In a fifteenth aspect of embodiments described herein, the second part Coupling Device includes a combination of a ferrite rod covered with a metal screen for directing the interrogator's field from a region close to the interrogator's antenna to the RFID tag located further away from the antenna and includes a tuned circuit for amplifying the field inside the ferrite rod where in the tuned circuit includes a coil wound on the screened ferrite rod and the metal covered ferrite rod, thereby changing the field direction to better align with the orientation of RFID tag. The coupling of the interrogation field to the RFID tag is enhanced when the RFID tag and the Coupling Device are moved proximate to each other for the purpose of interrogation.

In a sixteenth aspect of embodiments described herein, and referring to FIG. 6C, it would be advantageous to replace the jewelry item's 607 printed labels 103 with RFID tags that could speed up the identification process and eliminate errors throughout the jewelry business. Such an RFID tag must be a relatively small size. It is preferably stackable for bulk inventory identification, stocktake and tracking purposes when the jewelry items are packed inside transport boxes 608 and 611 and/or when stored in storage 609 and 612 and/or elsewhere in the jewelry business where two or more tags are closely spaced. This is advantageous as it allows the stock to be counted and checked without the need to individually unpack and handle each item. The RFID tag must be able to be read when individually mounted for display in the display cabinet 601 for real-time security monitoring, tracking and stock taking purposes. If jewelry labels are replaced with RFID tags then associated interrogator antennas may be required to interrogate the RFID tags. In order to conform to the aesthetics of the jewelry displays, the interrogator antennas typically would be incorporated into the floor 301 of the display cabinets 601, for example as illustrated in FIGS. 6A and 6B, where the interrogator antenna(s) is denoted numeral 604.

In another aspect of embodiments described herein, there is provided a method of identifying an arbitrarily large number of items having associated RFID tags.

Preferably, a method of reading and/or interrogation is substantially in accordance with the disclosure in WO2004/019055, herein incorporated by reference.

Preferably, a method of reading and/or interrogation is substantially in accordance with U.S. Pat. No. 5,302,954 herein incorporated by reference.

Preferably, a method of powering, interrogating and/or communicating with an RFID device is substantially in accordance with WO1999/034526, herein incorporated by reference.

Preferably, a method of powering, interrogating and/or communicating with an RFID device is substantially in accordance with WO2007/030861, herein incorporated by reference.

Preferably, a method of powering, interrogating and/or communicating with an RFID device is substantially in accordance with WO2009/149506, herein incorporated by reference.

Preferably, a method of powering, interrogating and/or communicating with an RFID device is substantially in accordance with Australian Patent Application 2013201425, herein incorporated by reference.

Other aspects and preferred forms are disclosed in the specification and/or defined in the appended claims, forming a part of the description of the invention.

Without limitation, aspects of embodiments of the present invention are suitable for use in the identification of RFID transponders or other RFID devices, such as those attached to items or embedded in plastic tokens or cards that are arranged closely together and/or are stacked on each other for logistical and storage purposes and/or placed on shelving for display purposes. Furthermore, a number of aspects of embodiments of the present invention relate to an arrangement and/or layout of an RFID tag including an arrangement of a Coupling Device adapted to enhance the coupling between the interrogator antenna and the RFID tag for the purpose of interrogation, especially when the RFID tag and the Coupling Device are moved proximate to each other for the purpose of interrogation.

In applications such as jewelry, RFID tags may be used to tag each jewelry item for identification, tracking, security and stocktake purposes. These tags are also desired to be stackable for identification of jewelry in bulk when being stored or transported. Tags attached to jewelry must be very small. When displayed the jewelry items are placed in pre-set locations for optimum viewing. Each jewelry item is placed on an individual display stand or in a unique slot on a display tray for viewing. The RFID tag, with pricing information, would be inserted into special pockets or cavities in the stand or tray to put it out of sight. Often the orientation of the tag is undesirable for long range operation.

The present invention, in one form such as jewelry items, serves to extend the operating range of small stackable RFID tags when they are placed in pre-set locations and in an undesirable orientation. The individual display stands and the display trays are moveable and any solution should work regardless of the position of the display stand or tray. Small stackable tags of the prior art will have a short interrogation range making them typically unsuitable for interrogation whilst being displayed for sale.

In essence, embodiments of the present invention stem from the realization that an RFID tag can be made to operate advantageously in two modes whereby in a first mode the tag has a relatively short range S, and in the second mode, the tag has an extended or longer range E (where E is a greater distance than S). In the first mode, the tag(s) are stackable and has a relatively short range and in a second mode the tag has an extended, relatively longer range compared to the short range. The tag is converted and or changed from the first mode to the second mode by placing it proximate a coupling device. That is in the second mode the tag becomes a two part tag where the first part is a tag which has a short range and the second part is a coupling device which converts the tag into a longer range tag when the tag and the coupling device are placed proximate each other. In one of the embodiments of the present invention, the tag has an untuned coil for the relatively short range of operation, and a tuned coil for the extended range of operation.

Advantageously the first mode of operation is useful in a stackable tag which can be read when bulk or stacked tagged items are being processed and where short range is not a disadvantage for operation. The second mode of operation is useful where extended range (longer range than the short range) serves to enable tag(s) to be read from relatively longer distances. The second mode may be enabled when the tag is placed proximate a coupling device for display purposes. In another embodiment, the tag may be individually separated for reading. The placement of the short range tag proximate the coupling device changes the circuit operation of the short range tag with the newly formed longer range operating tag circuit having an enhanced operating range. The coupling device can take a number of forms further details of which are discussed below.

Advantageously in the first mode the tag may be an untuned stackable tag. In the second mode the tag is a two part tag. One part is the above mentioned untuned stackable RFID tag and a second part is a Coupling Device designed to enhance the coupling between the interrogator antenna and the RFID tag for the purpose of interrogation, especially when the RFID tag and the Coupling Device are operationally coupled by bringing together. The Coupling Device is used to enhance the interrogation signal and direct this enhanced interrogation signal to the RFID tag. Where the Coupling Device is tuned, the combination of a stackable tag with the tuned Coupling Device changes the tag's operation to that of a tuned tag. When coupled to a tuned Coupling Device the tag behaves as a tuned tag. Advantageously the coupling device changes the mode of operation of the tag from an untuned tag, with short range, to a tuned tag with long range operation.

For the jewelry application as envisaged, each jewelry item is placed on an individual display stand or in a unique slot on a display tray for viewing. A Coupling Device can be built into each display stand or each slot location on the display tray. When the jeweled item (with its RFID tag) is placed into the stand or slot, the RFID tag is brought close to the Coupling Device, thereby changing the operating mode of the tag and enhancing the operation of the tag such that the tag can operate even though it is far away from, and poorly oriented, to the Reader antenna.

The coupling device can take many forms including both resonant and non-resonant forms. Four example forms are:

1. Ferrite rod or rods oriented along the axis of the RFID tag to amplify the local field near the RFID tag and direct it through the RFID tag.

2. Ferrite rod for directing the field from a region close to the Reader antenna to the RFID tag located far away from the antenna. The ferrite rod may be covered with a metal screen and may also be designed to change the field direction to match the orientation of a poorly oriented RFID tag.

3. Vertically oriented ferrite rod for directing a field upwards from a region close to the Reader antenna up to the RFID tag located far away from the antenna. The ferrite rod may be covered with a metal screen and may also be designed to change the field direction to match the orientation of a poorly oriented RFID tag.

4. Tuned circuit designed to amplify the interrogation field by resonance. The tuned circuit can capture the interrogation field over an area or enhance the field inside a ferrite rod.

These four example forms and other similar forms can be combined in any suitable combination or combinations depending upon the specifics of the application to enhance tag interrogation performance.

In one example of an aspect of the present invention, the Coupling Device can be configured to change direction. The ferrite rod can be in the form of a T or an inverted L or U shape. Two or more ferrite rods can be connected to form a T or an inverted L or U shape. A metal screen wrapped around the ferrite confines the field and forces it to bend and follow the path of the ferrite rods. Bent screened ferrite rods can be used to direct the field to the top of a curved or bent display unit such as is used for high value necklaces.

In another example of an aspect of the present invention, the Coupling Device can couple to multiple tags simultaneously. The screen around a field directing ferrite rod can be made to leak so that a fraction of the directed field leaks out along its length. Tags located along the length of the leaking rod will couple to the interrogator and be interrogated. A length of leaky rod is useful for a display unit where many items are place next to each other such as a display for low value chains or necklaces.

The present invention has many applications, including any application where RFID tags are used to identify items, especially for the purpose of identifying high value items on display and knowing precisely if they have been removed from the display area. For example, in RFID shelving applications such as jewelry and watches. In a particular application, the present invention may be used in conjunction with RFID devices, such as, by way of example only, RFID transponders, tags, tokens, labels, etc. Such devices may be used in a wide variety of applications, including, without limitation, article tracking such as shelving and storage systems, medical devices and supplies, documents and document tracking and access control.

In one form, the invention relates to an identification system, and devices used in the system. Examples of the devices include transponders and/or apparatus adapted to be incorporated into items for storage or display on shelving and/or in storage or display systems which utilise cabinets. Another example of the devices includes transponders and/or apparatus adapted to be incorporated into articles in a hospital, such as medical instruments, medical devices, medical implants and medical supplies, for the purposes of stocktaking, billing and ordering. Still another example of the devices includes transponders and/or apparatus adapted to be incorporated into articles in a secure site, such as legal evidence samples which employ the use of a transponder and/or other identification device attached to the sample(s) for the purposes of monitoring and/or recording movements of the samples. Still another example of the devices includes tokens and/or apparatus adapted to be incorporated into gaming tables and/or devices for monitoring and/or recording gaming or other transactions or movements in a casino, such as gaming transactions which employ the use of a gaming token which token has a transponder and/or other identification device therein.

In another form, the invention relates to a system. Further details are disclosed herein.

Advantages provided by the present invention includes at least one or some of the following:

1. Provides stackable tags with the capability of either untuned or tuned operation allowing low cost stackable tags to be used untuned for bulk or stacked identification and tuned for long range operation when singulated.

2. Used with low cost stackable tags to increase the interrogation range of a stackable RFID tag in a display cabinet or shelf, 3. Used to precisely identify if an item is removed from a display cabinet or shelf, 4. Used with simple antennas for creating only a one dimensional field above the reading area inside a display cabinet of shelf, 5. The system cost is kept relatively low because of the small number of Coupling Devices relative to the large number of tagged items, or 6. The emissions from the interrogator's antennas can be kept relatively low because of the lower field strength required for tag operation.

Throughout this specification, reference to a 'tag' is intended to include, without limitation, any identification device(s) rendered in any technology which enables identification, for example an RFID device comprising a microchip placed on a powering, transmitting and/or receiving antenna carried on a substrate (inlay) and that is powered externally by an electromagnetic field, an inductive field, a magnetic field or by a battery. 'Tag' also includes reference to one or more RFID tags and/or reference to a tag(s) as disclosed in the incorporated disclosures noted above.

In one specific form of the invention, a tag may be a label or adhesive note or have any other method of affixing identity to an article or thing in any form, such as a device comprising an Application Specific Integrated Circuit (ASIC) "chip" attached to an antenna or having an antenna attached to it, or where an antenna forms part of the chip assembly itself and where the chip and the antenna structure, including optionally a capacitor or capacitors and which device, functions as an inductively powered passive transponder or a battery powered electronic transponder or is a transponder powered by some other means.

Without limitation, a tag may be a gaming token, chip, identification device, badge, tag, ticket, playing cards, betting slip lottery ticket, a transponder, a token, insert, transponder, chip, label, identification device, badge, inlet, inlay, ticket, wireless memory or any other form of identifiable device and may be rendered in any technology which enables identification. For example, the tag may be an RFID tag. In a further example, and without limitation, the identification device may be an ASIC, other microchip, an ASIC with an associated antenna assembly, or an antenna without a chip where electronic circuitry included in the printed antenna structure, provides the intelligence of the device, logic means or is a tuned antenna.

Throughout the specification, reference to an 'item' includes reference to one or more items or articles and is anything associated with a tag. Furthermore, reference to an item may include reference to one 'item' residing in or being associated with another 'item'. An 'item' may refer to any other item that can be identified, traced or tracked, such a medical devices, medical supplies or medical implants, postal or courier items, parcels, food, package, baggage, or any other product or good whatsoever.

Throughout this specification, reference to an 'interrogator' or 'interrogated' includes reference to a read only or read and write device or actuator that may power a tag, communicate with a tag, receive information from a tag, read a tag, transmit information to a tag and/or signal to and/or from a tag. This includes for example an RFID enabled regions, stores and/or containers adapted to communicate with tags stored or moved therein.

Throughout this specification, a tag may be rendered in any technology which enables identification. The tag may operate at any one or more of the recognised RFID frequency band that is LF, HF, UHF or SHF but is in no way limited to those frequency bands.

Further scope of applicability of embodiments of the present invention will become apparent from the detailed description given hereinafter. However, it should be understood that the detailed description and specific examples, while indicating preferred embodiments of the invention, are given by way of illustration only, since various changes and modifications within the spirit and scope of the disclosure herein will become apparent to those skilled in the art from this detailed description.

BRIEF DESCRIPTION OF DRAWINGS

Further disclosure, objects, advantages and aspects of preferred and other embodiments of the present application may be better understood by those skilled in the relevant art by reference to the following description of embodiments taken in conjunction with the accompanying drawings, which are given by way of illustration only, and thus are not limitative of the disclosure herein, and in which:

FIGS. 18A, 18B and 18C illustrate an embodiment of the invention implemented by the screening of a relatively long high permeability rod.

Like numerals represent like components throughout the description of the present invention.

DESCRIPTION OF EMBODIMENTS

Figure 1:
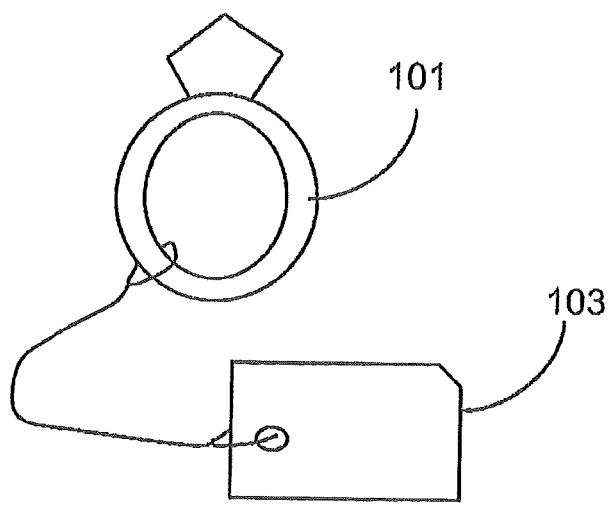
FIG. 1 illustrates an example application of a ring with a printed label to which the present invention may be applied.
Figure 2A:
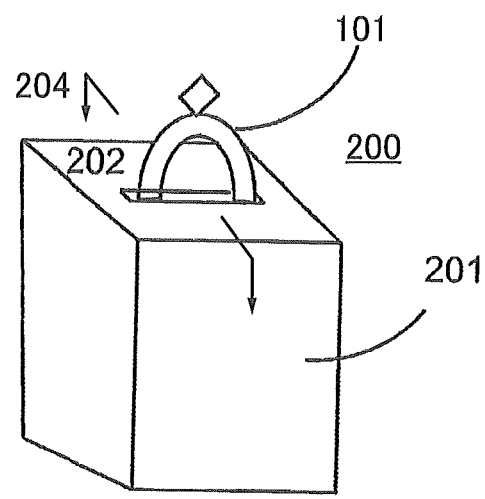
FIGS. 2A and 2B illustrate a ring mount as an example application to which the present invention may be applied.
Figure 2B:
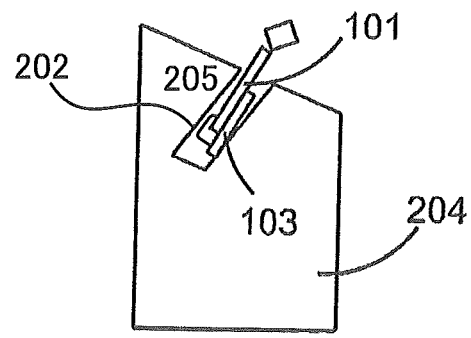
Figure 3:
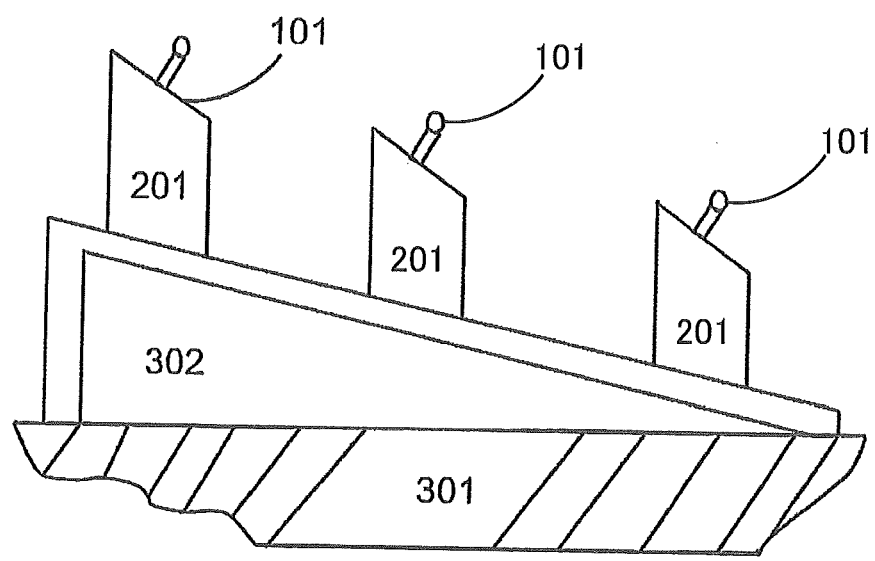
FIG. 3 illustrates a tray for ring mounts as another example application to which the present invention may be applied.

The exemplary embodiments described herein detail for illustrative purposes are subject to many variations. It should be emphasized, however, that the present invention is not limited to the embodiments illustrated herein. It is understood that various omissions and substitutions of equivalents are contemplated as circumstances may suggest or render expedient, but these are intended to cover the application or implementation without departing from the spirit or scope of the present invention.

Passive RFID tags are known and generally include a resonant tuned antenna coil that is mounted to a substrate and electrically connected to an integrated circuit (IC). Examples of RFID tags that include a resonant tuned antenna coil are U.S. Pat. No. 5,517,194 (Carroll et al), U.S. Pat. No. 4,546,241 (Walton), U.S. Pat. No. 5,550,536 (Flaxel) and U.S. Pat. No. 5,153,583 (Murdoch). These systems have been developed for applications, such as baggage handling, where the RFID tags are used individually and are unlikely to be located close to one another.

The tag's tuned antenna coil has a resonant frequency, and it is at the said frequency that an interrogator generates a magnetic field. When the coil is located within the field, the two couple and a voltage is generated in the coil. This voltage is magnified by the tuned antenna coil's Q factor and is used to provide electrical power to the tag's chip. This power is used by the passive tag to allow the generation of a coded identification signal that is transmitted to the interrogator.

The resonant current that flows in the tuned antenna coil, and any current that flows in the antenna coil (tuned or not tuned) also generates a magnetic field in the region of the coil. This is usually unproblematic, unless there is an object—such as another tag—disposed near the coil. It is possible that in such a situation, the object may couple with the magnetic field. Should that coupling occur, the voltage generated by the coil, will be reduced. This, in turn, will reduce the power that is available for use by the tag. If insufficient power is available, the tag will dysfunction and will not provide the identification signal to the interrogator.

In baggage handling systems, separate tags are usually spaced sufficiently apart to allow reliable operation. However, in applications where tags are closely spaced, the efficacy of such systems is compromised by the mutual coupling between tags. There are many applications where tagged items are preferentially identified in bulk, either randomly heaped or tightly stacked together, in order to allow their rapid identification without the need to unpack and/or singulated each tagged item. Examples of such applications are the identification of letters, documents or envelopes, gaming tokens, packaged orthopaedic implants or medical items, blood bags and diamonds. The jewelry application has been problematic because tags must be capable of both identification when tightly stacked in bulk at short range and when singulated or separated at a long range. This dual functional and range requirement has prevented the adoption of RFID for jewelry.

For tags to operate in close proximity, it is important that resonant currents are eliminated and that the remaining antenna currents are minimised. WO2004/019055 (Murdoch) teaches such an invention for tags that are operating in close proximity. WO2004/019055 shows that even with the resonant capacitor removed, the antenna current drawn by the IC during operation is still too large to allow a plurality of like tags to be closely stacked. If the tags are within a few millimeters of each other the currents drawn by their respective IC's from their respective antenna coils will, in effect, stop the tags operating with the required reliability.

WO2004/019055 teaches that minimising the antenna currents in a majority of tags allows tags to operate when closely stacked. WO2004/019055 shows various methods of minimising the antenna current. The essence of the invention is that only a small proportion of tags are in a 'Normal Power State' drawing their full operating current from their respective antenna coil, whilst the majority of tags are in a 'Low Power State' where they are minimally functional and draw a significantly lower current. Where tags randomly, or pseudo-randomly, select their Power State, the average distance between Normal Power State operating tags will be relatively larger than the individual distance between tags by the inverse of the probability of selecting Normal Power State. Hence, the average distance between operating tags will be greatly increased and the coupling between operating tags will be greatly reduced. With a greatly reduced coupling, the operation of tags will not be adversely affected by their close proximity or stacking with other tags. Tags move randomly or pseudo randomly between these Power States and once identified tags are moved to the Low Power State to assist with the identification of the remaining tags.

In the absence of resonant tuning, the antenna coil's voltage is relatively low because it is not magnified by the tuned circuit's Q factor. To compensate, WO2004/019055 increases the voltage supplied to the tag during Normal Power operation in order to operate with a lower coil voltage; the lower coil voltage also requiring a lower interrogation field. The tag IC includes an integrated switchable voltage doubler circuit where the antenna voltage can be either rectified to DC for Low Power State operation or voltage may be doubled to DC for Normal Power State operation. Control of this state selection of the voltage multiplication being controlled by a simple switch circuit.

Despite the inclusion of a voltage multiplier circuit without tuning, the tag requires a significantly higher interrogating magnetic field strength. Typically five times higher than for a comparable tuned coil, and the interrogator is required to provide a correspondingly higher field strength. For many applications the requirement for extra field is not particularly problematic except where the tag size is small.

The inventor is aware of a number of interrogators or interrogator antenna systems that provide one and two dimensional, limited three dimensional or full three dimensional interrogator capabilities for the stackable tags described in WO2004/019055. These systems utilise a multiplicity of interrogator coils operating in different coordinate axis, to achieve the resultant one, two or three dimensional operation.

One example of an interrogator which produces a relatively uniform field in three dimensions is disclosed in U.S. Pat. No. 5,258,766 and international application PCT/AU95/00436. This form of interrogator is known as a Tunnel Reader Programmer (TRP) and is suitable for applications where the RFID transponders are moved in and out of the TRP, usually on a conveyor or similar.

Another example of an interrogator is WO2007/030861, which discloses an antenna design and method of operation which enables a one, two or three dimensional interrogation field to be created from an array of flat planar antenna coils and is suitable for applications where tags are located on a relatively flat surface such as a shelf, storage system, table, wall or cabinet.

Another example interrogator is Australian Patent Application 2013201425, which describes how an antenna is shifted (displaced or moved) in order to create the effect of interrogation by a relatively larger antenna array. Australian Patent Application 2013201425 is suited to relatively large fixed shelving and storage installations where there is a need to cover a relatively large area at a reduced cost.

Provided the coil of the RFID tag collects sufficient magnetic flux for operation, the interrogators described above work well with the stackable tags described in WO2004/019055.

Figure 7:
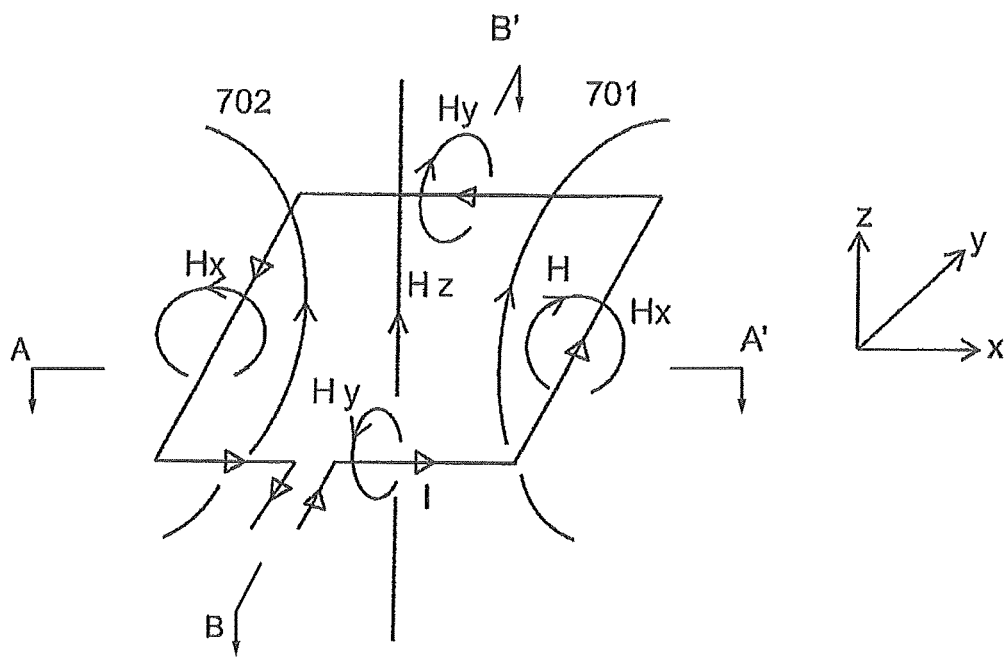
FIG. 7 illustrates, in schematic form, a single coil of rectangular form and its resultant magnetic field when energised.

FIG. 7 illustrates, in schematic form, a conventional single coil 701 of rectangular form through which a current I flows. The resulting magnetic field 702 directions are shown and related to the X, Y and Z coordinate directions is also shown. At different regions above (or below) the coil 701, the magnetic field has a unique direction which is variously in the X, the Y or the Z directions, or some combination of these directions in transition regions.

Figure 8:
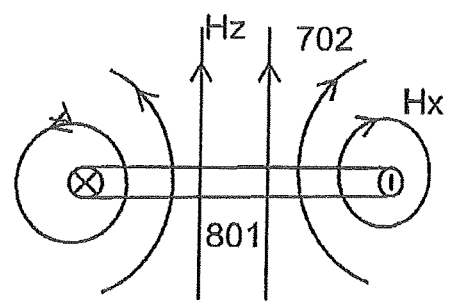
FIG. 8 illustrates, in cross section, the coil of FIG. 7 and the resultant magnetic field when energised.

FIG. 8 illustrates a cross section view 801 of the coil 701 taken along the line A-A' of FIG. 7 and also shows the direction of magnet field 702 in the plane of the cross section. The field directions are in the X and Z directions. A cross section view along the orthogonal line B-B' would have same shape except that the field directions would be in the Y and Z directions.

Figure 9:
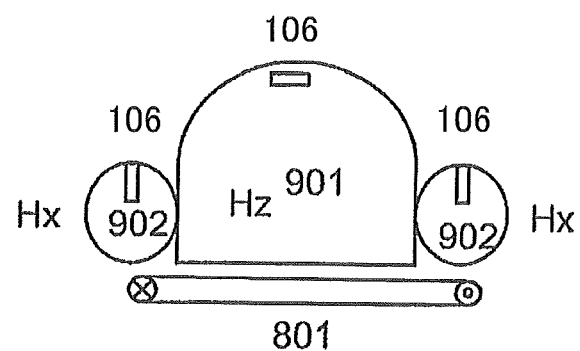
FIG. 9 illustrates, in cross section, regions around the coil of FIG. 1 where magnetic fields are produced.

FIG. 9 illustrates the regions of predominant field regions for the X direction 902 and the Z direction 901 above the coil 801 of the cross sectional view shown in FIG. 8. The maximum range of an RFD tag 106 in the X and Z direction is shown. The coupling between the coil 801 and the RFID tag 106 is significantly better in the Z direction than the X direction. This is likewise true for a tag oriented in the Y direction. The coupling between the coil 801 and the RFID tag 106 is significantly better in the Z direction than in the Y direction.

Figure 10:
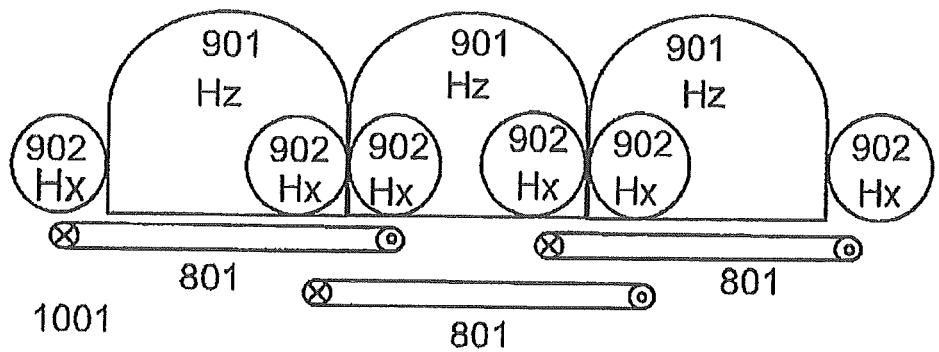
FIG. 10 illustrates, in cross section, an array of coils and illustrates how, when appropriately switched, a field in the Z direction is produced as described in WO2007/030861.

FIG. 10 illustrates an array 1001 of coils 801. When appropriately switched, a field in the X direction, Y (not shown for clarity purposes) and Z directions is produced as described in WO2007/030861. In this regard, by suitably overlapping generally rectangular coils and then sequentially switching each coil so that only one coil is active at any time, at any point above (or below) the overlapped coils, a field in the X direction, the Y direction and the Z direction may be produced at some time.

Figure 11:
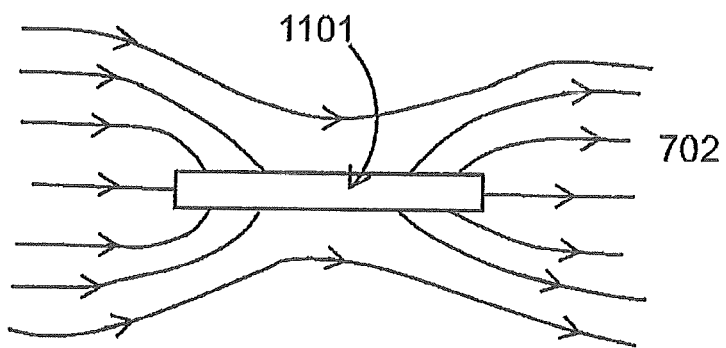
FIG. 11 illustrates the effect of a high permeability rod on a magnetic field.

FIG. 11 illustrates effect of a high permeability rod 1101 on a magnetic field 702. The rod 1101 is typically made of a ferrite material grade designed for the operating frequency. An example of a material grade suitable for high frequency operation includes, but is not limited to, F14™ made by Neosid. The ferrite rod 1101 serves to concentrate the local magnetic field inside itself.

Figure 12:
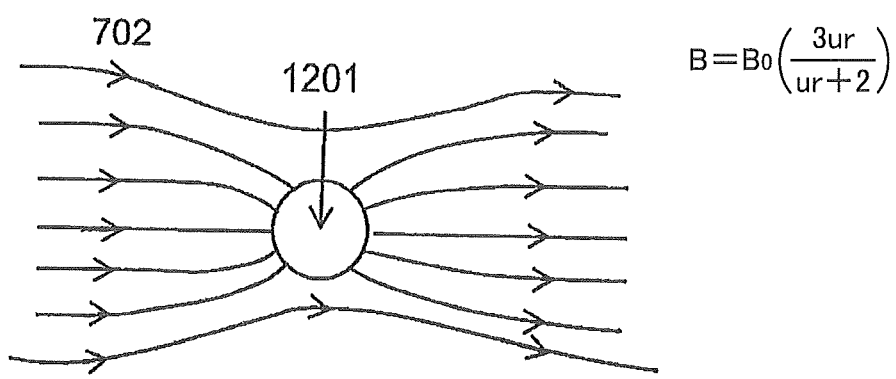
FIG. 12 illustrates the effect of a high permeability sphere on a magnetic field.

FIG. 12 illustrates effect of a high permeability sphere 1201 on a magnetic field 702 and gives the equation for the sphere's internal field B versus the external field $B_0$. The sphere 1201 is typically made of a ferrite material grade designed for the operating frequency. An example of material grade suitable for high frequency operation includes, but is not limited to, F14™ made by Neosid. The ferrite sphere 1201 serves to concentrate the local magnetic field inside itself. For a high permeability material, the internal field B is three times the external field $B_0$.

Figure 13:
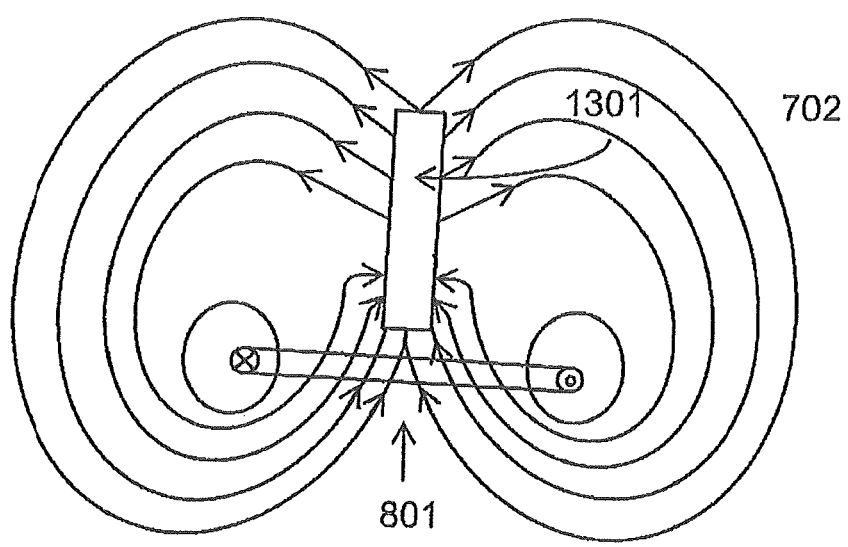
FIG. 13 illustrates a magnetic field associated with a long high permeability rod suspended vertically above a coil.

FIG. 13 illustrates the magnetic field 702 associated with a long high permeability rod 1301 suspended vertically above a coil 801. At the bottom of the rod 1301, the local magnetic field is concentrated into the rod 1301, and the field exits along the whole remaining length of the rod 1301. At the very top of the rod 1301, the field is diminished as a large proportion of it has already exited from the rod 1301. However, it is to be appreciated that there is remaining magnetic field exiting from the top end of the rod 1301.

Figure 14A:
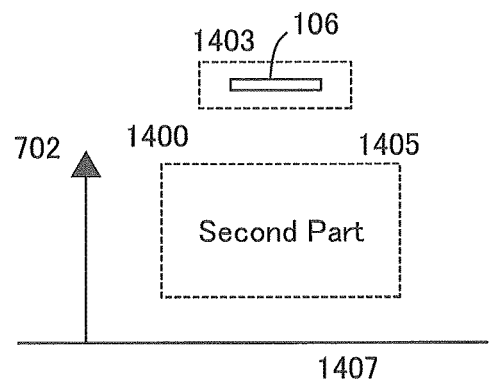
FIG. 14A illustrates an underlying concept of the present invention, according to various embodiments of the present invention.

FIG. 14A illustrates basic underlying concept of the present invention. As shown in FIG. 14A, the present invention provides a tag that can operate in two modes. In the first mode the tag 1403 is a device with a short range RFID tag 106 and in the second mode the tag is a two part RFID tag system or RFID extended range operation system 1400 employed for variety of applications. The two part RFID tag system 1400 includes a first part 1403, which has at least one RFID tag 106. In the FIG. 14A only one RFID tag 106 is shown. Further, the two part RFID tag system 1400 includes at least one second part 1405 operably associated to the first part 1403 for interrogation. The at least one second part 1405 is adapted to enhance the coupling between the at least one RFID tag 106 and an associated interrogator antenna 1407 for enhancing the performance of the at least one RFID tag 106. Various configurations of the second part 1405 will now be explained with reference to various FIGS. 14B-30.

Figure 14B:
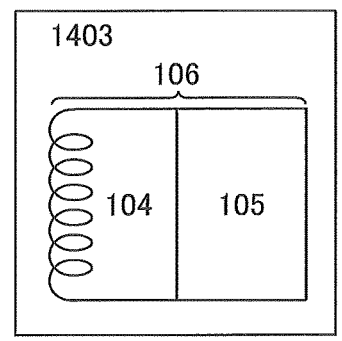
FIG. 14B illustrates a schematic circuit for the RFID tag of an embodiment of the invention.
Figure 14C:
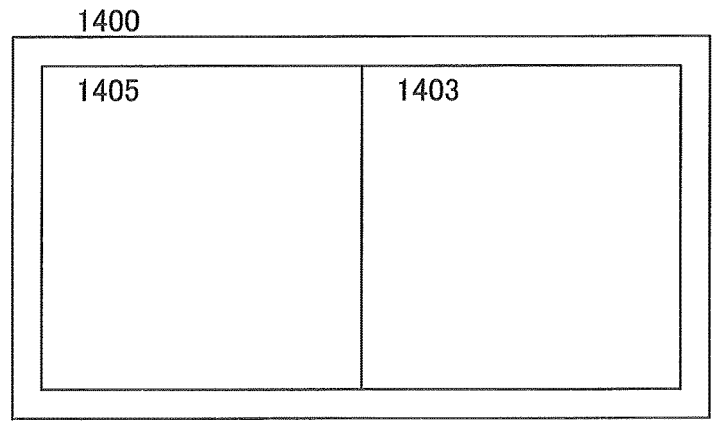
FIG. 14C illustrates an underlying concept of the invention, according to various embodiments of the present invention.

FIG. 14B illustrates a schematic circuit for the first mode tag 1403 shown in FIG. 14A. The first mode tag 1403 includes an RFID tag 106 consisting of a coil 104 and an RFID microchip 105. FIG. 14C illustrates a schematic for the second mode tag 1400. The second mode tag 1400 is a two part tag consisting of the first mode tag 1403 and a proximate coupling device 1405 which together form the second mode tag.

Figure 15A:
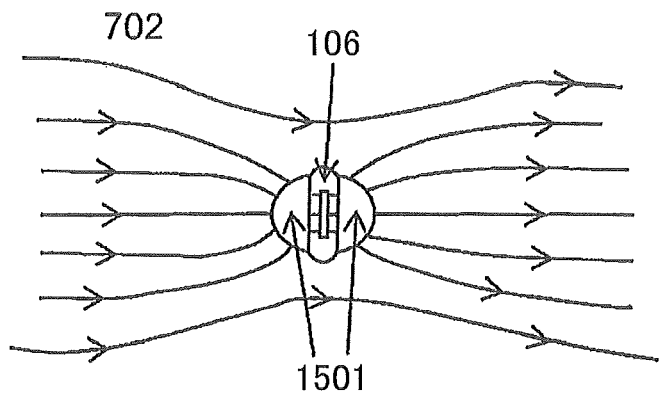
FIG. 15A illustrates and embodiment of the invention implementing a high permeability sphere split into hemispheres in order to insert an RFID tag.

Now referring to FIG. 15A, there is illustrated an embodiment of the invention implementing a high permeability sphere split into hemispheres 1501 in order to insert an RFID tag 106. For a high permeability material, the internal field B is three times the external field Bo 702. Provided the separation between the spheres 1401 is small, there is only a small reduction in the internal field due to fringing. The internal field typically fringes out to a distance equal to a separation distance. The tag 106 located between the hemispheres 1401 will experience a field strength that is almost three times higher than that faced without the hemispheres 1401 for small separations.

Figure 15B:
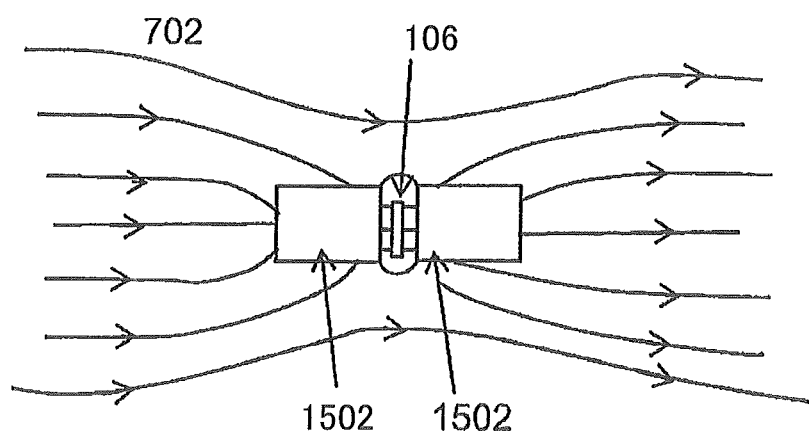
FIG. 15B illustrates an embodiment of the invention implemented with the hemispheres of FIG. 15A replaced with short high permeability rods.

FIG. 15B illustrates an embodiment of the invention implemented with the hemispheres 1401 of FIG. 15A replaced with short high permeability rods 1502. The internal field typically fringes out to a distance equal to a separation distance. The tag 106, located between the short high permeability rods 1502, will experience a field strength that is higher than that faced without the short high permeability rods 1501 and 1502.

Figure 16:
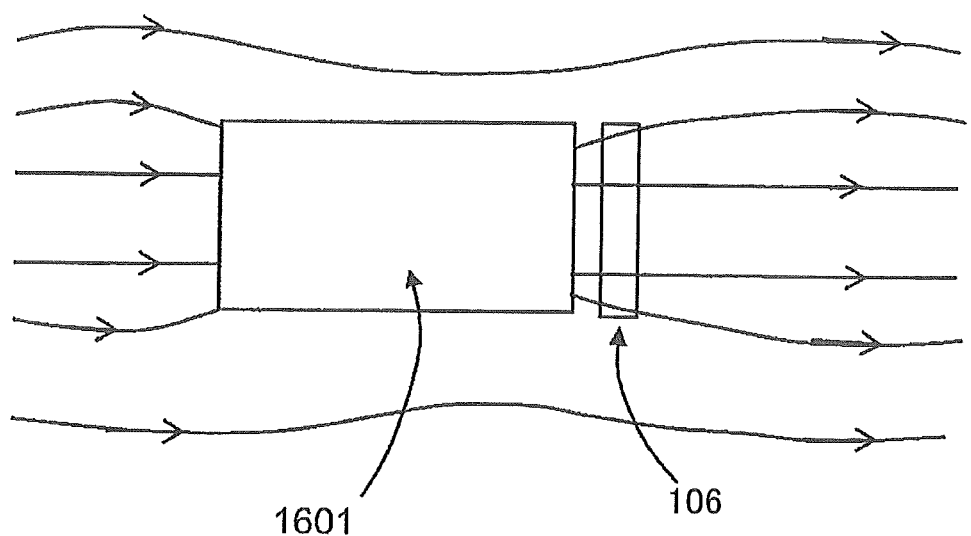
FIG. 16 illustrates an embodiment of the invention implemented where a single short high permeability rod can be used with an RFID tag.

FIG. 16 illustrates an embodiment of the invention implemented where a single short high permeability rod 1601 can be used with an RFID tag 106. The tag 106 intercepts the field as it diverges from the rod 1601. The tag 106 located close to the high permeability rod 1601 will experience a field strength that is higher than without the short high permeability rod 1601.

Figure 17A:
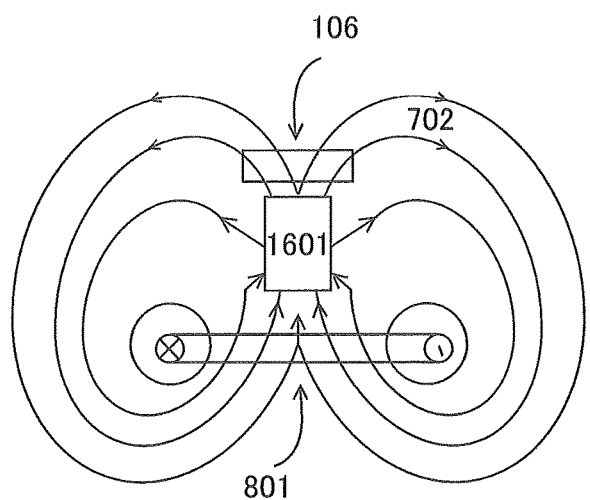
FIG. 17A illustrates the magnetic fields associated with the embodiments of FIG. 16.
Figure 17B:
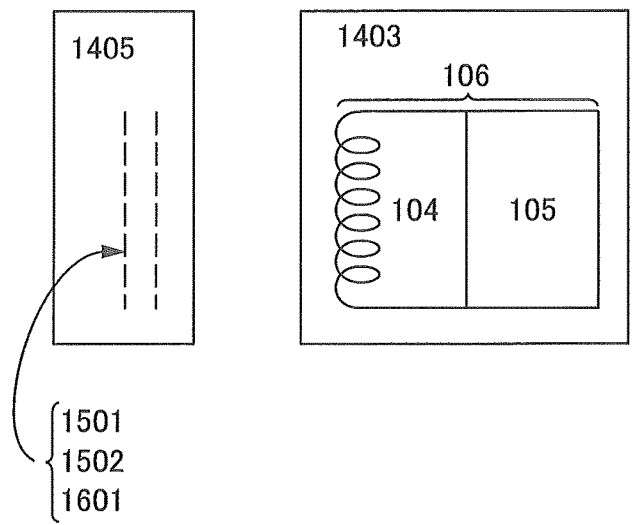
FIGS. 17B and 17C illustrate schematic models for the embodiments of the invention shown in FIGS. 15A, 15B and 16.
Figure 17C:
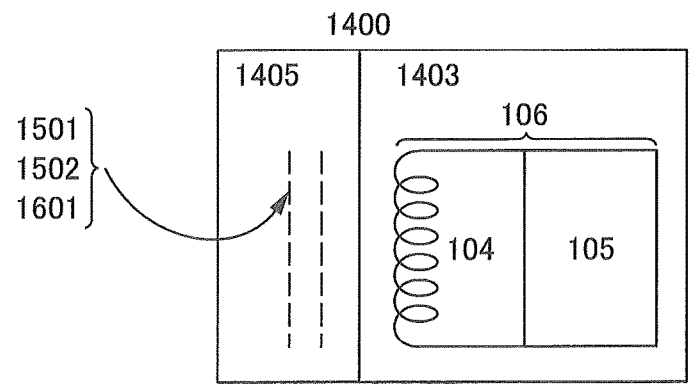

FIGS. 17A, 17B and 17C illustrate the magnetic fields associated with the embodiment of FIG. 16 and schematic models for the invention arrangements of FIGS. 15A, 15B, 16 and 17A.

FIG. 17A illustrates the magnetic field 702 associated with a short high permeability rod 1601 suspended vertically above a coil 801. At the bottom of the rod 1601, the local magnetic field is concentrated into the rod 1601 where upon the field exits along the remaining length of the rod 1601. A tag 106 is located proximate the top of the rod 1601, and along the axis of the rod 1601. Provided the tag 106 is close to the rod 1601, for a short length rod 1601, the tag 106 intercepts a significant fraction of the field concentrated in the rod 1601 and will experience a field strength that is higher than that faced without the short high permeability rod 1601. This enables a better access of the field of the coil 801 to the tag 106.

FIG. 17B illustrates a circuit schematic for the invention when the tag 106 is in the short range first mode. The first mode tag 1403 is separate from and not coupled to the coupling device 1405. The first mode tag device 1403 consists of a tag 106 where the tag 106 consists of a coil 104 and tag chip 105. The coupling device 1405 consists of a ferrite device being any of the dual hemispheres 1501, dual short rods 1502 or single short rod 1601. When parts 1403 and 1405 are separate they are not coupled together and the RFID tag 106 has a short range.

FIG. 17C illustrates the invention when the tag is in the long range second mode form 1400. The coupling device 1405 and the first part device 1403 are brought together and are proximate to form the invention embodiment 1400 where in the tag coil 104 connected to the tag chip 105 is shown closely coupled to the ferrite device 1501, 1502, 1601. The magnetic field collected or concentrated in the ferrite device 1501, 1502, 1601 inductively couples to the tag coil 104 inducing an enhanced interrogation signal in the tag coil 104.

FIGS. 18A, 18B and 18C illustrate various embodiments of the invention coupling device 1405 implemented by the screening of a long length high permeability rod 1803.

FIG. 18A illustrates a screened rod combination 1803 including a long ferrite rod 1801 and a conductive screen 1802. The screen 1802 is made of a good conductor, such as copper or aluminium, and is preferentially two or more skin depths thick at the operating frequency. For high frequency operation, the skin depth is typically 20 micrometers (μm) in aluminium. However, such ranges of the skin depth should not be construed as a limitation to the present invention, and accordingly, the screen 1802 can have higher or lower skin depths. As illustrated, the screen 1802 is wound around the ferrite rod 1801 except a region 1810 (unscreened portion) close to a one end of the ferrite rod 1801 to collect magnetic field efficiently.

In one embodiment, aluminium adhesive tape, 200 μm thick, is readily available and particularly suitable for use as a screening material for the conductive screen 1802. The overlap 1804 or gap 1805 of the screen 1802 is shown for clarity purposes as a simple line however, as will be shown in FIGS. 18B and 18C, this portion of the screen 1802 has a much more complex form.

FIGS. 18B and 18C illustrate cross sectional views of two embodiments of the screen 1802. The screen 1802 does not form a shorted turn around the ferrite rod 1801. If a shorted turn is formed the magnetic field in the rod 1801 will be cancelled and accordingly, such a shorted turn, should be avoided.

FIG. 18B illustrates how the screen 1802 is wound around the ferrite rod 1801 with an overlap 1804 sufficient to prevent the rod's 1803 internal field from leaking through the overlap 1804. This implementation is a fully screened rod. The ends of the screen 1802 in the overlap 1804 should be prevented from touching otherwise a shorted turn will be formed. More specifically, the conductive screen 1802 includes the overlap 1804 (also referred to as overlap region 1804) formed by overlapping of edges 1807 of the conductive screen 1802 with a narrow clearance there between. The overlap 1804 is adapted to preclude the magnetic field to leak out across the length of the permeable rod 1801. For clarity purposes, the screen overlap 1804 is shown as a suitably annotated line in all subsequent figures.

FIG. 18C illustrates how the screen 1802 is wound around the ferrite rod 1801 with a gap 1805 (interchangeably referred to as gap region 1805) sufficient to allow the rod's 1803 internal field to leak out through the gap 1805. In one form the gap can extend along with the axis of the rod 1803. This implementation is a partially screened rod 1803, and provides the flexibility of redirecting the magnetic fields in the partially screened rod 1803 for various applications as explained in the later description. The ends of the screen 1802 in the gap 1805 should be prevented from touching otherwise a shorted turn will be formed. More specifically, the conductive screen 1802 includes the gap region 1805 formed by providing a gap between edges 1809 of the conductive screen 1802. The gap region 1805 allows the magnetic field to partially leak out from the gap region 1805 of the permeable rod 1801.

Figure 19A:
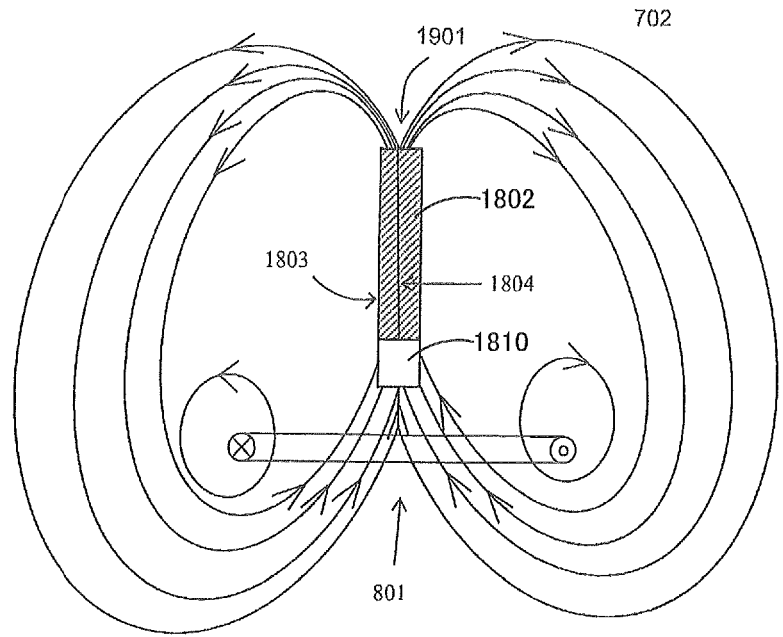
FIGS. 19A and 19B illustrate magnetic fields associated with embodiments shown in FIGS. 18A, 18B and 18C.
Figure 19B:
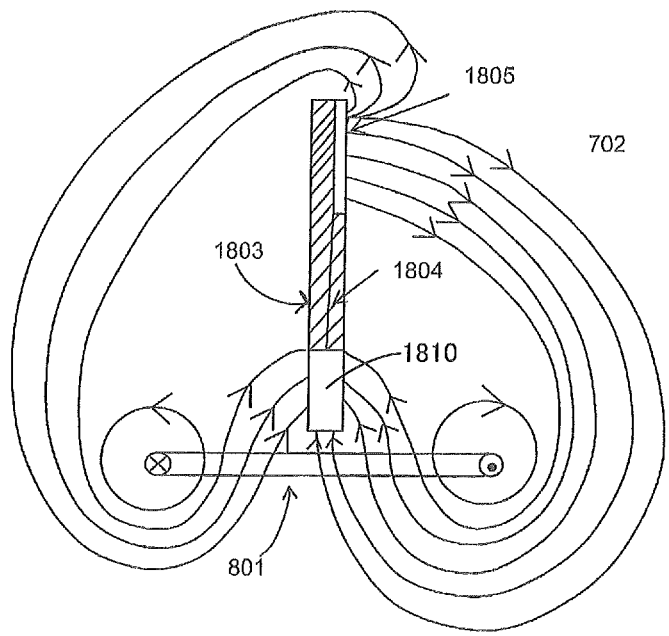

FIGS. 19A and 19B illustrate magnetic fields associated with embodiments shown in FIGS. 18A, 18B and 18C.

Specifically, FIG. 19A illustrates the magnetic field 702 of a fully screened ferrite rod 1803 suspended above a coil 801. The screen 1802 of the screened rod 1803 is overlapped 1804 in order to prevent the rod's 1803 internal field from leaking out through the overlap 1804. For the purposes of clarity, the overlap 1804 is shown as a single line. At the bottom of the rod 1803, or at the unscreened portion 1810, the local magnetic field 702 is concentrated into the rod 1803 where upon the field cannot exit until it reaches the top 1901 of the rod 1803. There is no loss of field 702 along the rod's 1803 length and the field at the top 1901 is substantially higher than without the screened rod 1803.

FIG. 19B illustrates the magnetic field 702 of a screened ferrite rod 1803 with both partial and full screening, where the rod 1803 is suspended above a coil 801. The lower portion screen of the screened rod 1803 is overlapped 1804, in order to prevent the rod's 1803 internal field from leaking out through the overlap 1804. The upper portion screen of the screened rod 1803 has a gap 1805 in order to allow the rod's internal field to leak out along the length of the gap 1805. At the bottom of the rod 1803, or at the unscreened portion 1810, the local magnetic field 702 is concentrated into the rod 1803 where upon the field cannot exit until it reaches the gaped portion 1805 of the rod's screen 1803. There is no loss of field 702 along the un-gaped portion 1804 of the rod's screen 1803. This implementation allows a control over the direction of the magnetic field 702 being directed by the screened ferrite rod 1803.

Figure 20A:
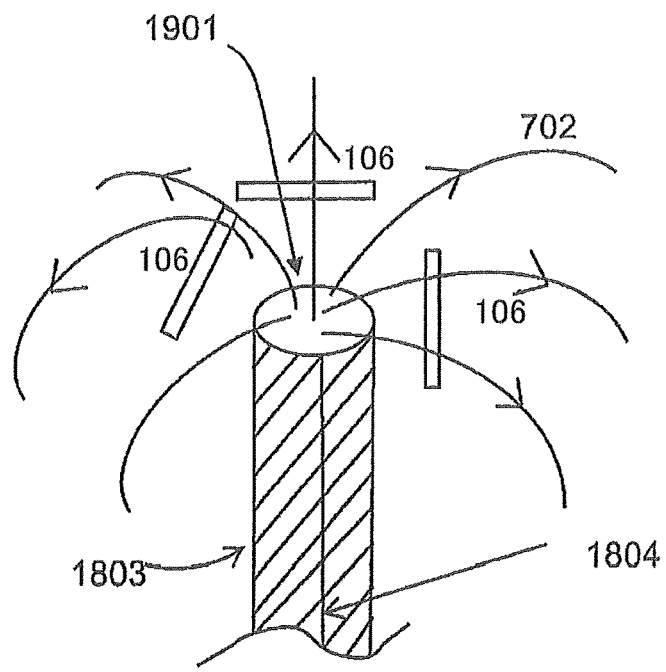
FIGS. 20A and 20B illustrate features of the magnetic field direction at the top in accordance with the embodiments shown in FIGS. 18A, 18B and 18C.
Figure 20B:
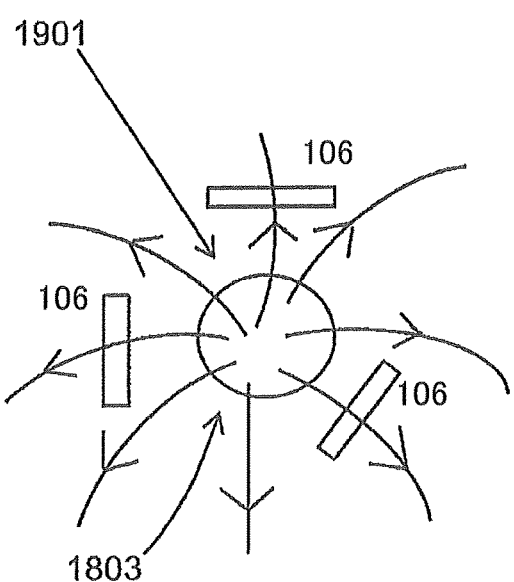

FIGS. 20A and 20B illustrate features of the magnetic field 702 direction at the top 1901 of the fully screened rod 1803 embodiment shown in FIG. 19A. FIG. 20A illustrates how the magnetic field 702 has both vertical and horizontal components and a tag 106, which may be oriented to intercept the vertical component, horizontal component or a combination of these components. FIG. 20B illustrates how the field 702 is radially symmetric and a tag 106 may be rotated and positioned to intercept the radial component of the magnetic field 702. However, the orientation of the tag 106 as illustrated should not be construed as a limitation to the present invention.

Figure 21A:
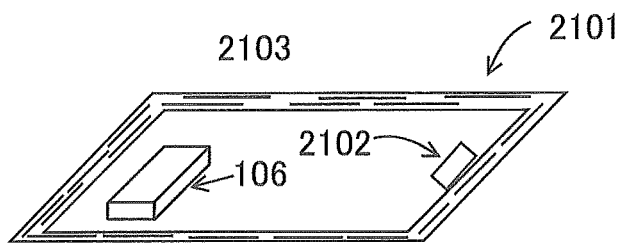
FIGS. 21A and 21B illustrate an embodiment of the invention implemented as a tuned device coupled with an RFID tag and a corresponding schematic circuit.
Figure 21B:
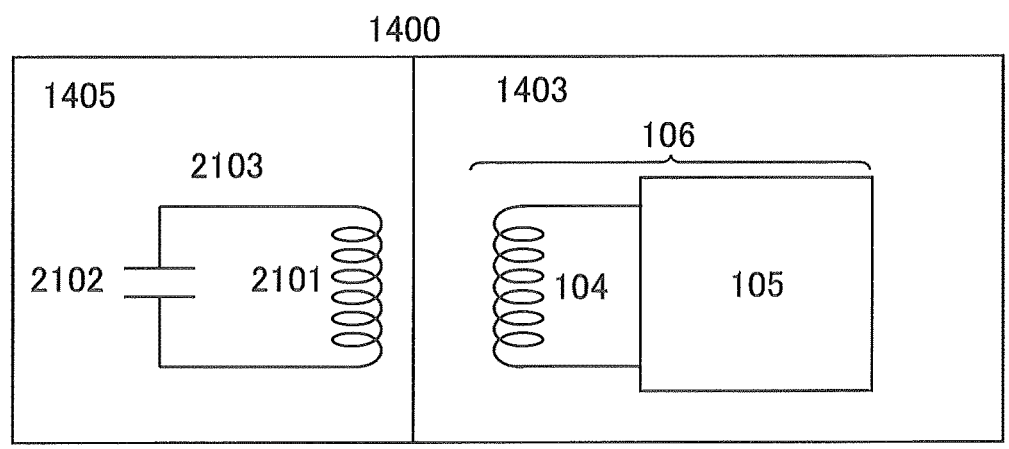

FIGS. 21A and 21B illustrate an embodiment of the invention in the long range second mode implemented as an air cored tuned coupling device 2103 (also referred to as air cored tuned circuit 2103) coupled with an RFID tag 106 and a corresponding schematic circuit.

FIG. 21A illustrates a tuned coupling device 2103 including a coil 2101 and at least one tuning capacitor 2102 (only one tuning capacitor 2102 shown in FIGS. 21A and 21B). The resonant frequency of the coupling device 2103 is chosen to optimise the performance of the tag 106 which has been positioned to inductively couple to the coupling device 2103. For optimum coupling both the RFID tag 106 and the coupling device coil 2103 are preferentially of the same or of a similar size however this is not critical for advantageous operation.

FIG. 21B illustrates a schematic circuit for the embodiment of the invention shown in FIG. 21A wherein the tag is in the form of the long range second mode tag 1400 formed by bringing together the coupling device 1405 and the first mode tag 1403. The coupling device 1405 consists of the tuned coupling device 2103 formed by the tuned circuit consisting of coil 2101 and the tuning capacitor 2102. The coil 2101 inductively couples to the coil 104 of the RFID tag 106 inducing an enhanced interrogation signal in the tag coil 104. The operation of tag 106 has been changed from an untuned to a tuned tag by the coupling device 2103.

The coil 2101 can also be advantageously designed to use its own self capacitance to self-resonate at the desired frequency eliminating the need for the separate tuning capacitance 2102. This reduces the construction cost and complexity by eliminating the tuning capacitor 2102 and the associated electrical connection, and mechanical attachment and mounting required for capacitor 2102. This reduces the overall cost for the tuning device 2103, thereby making the tuned coupling device 1405 inexpensive.

Figure 22:
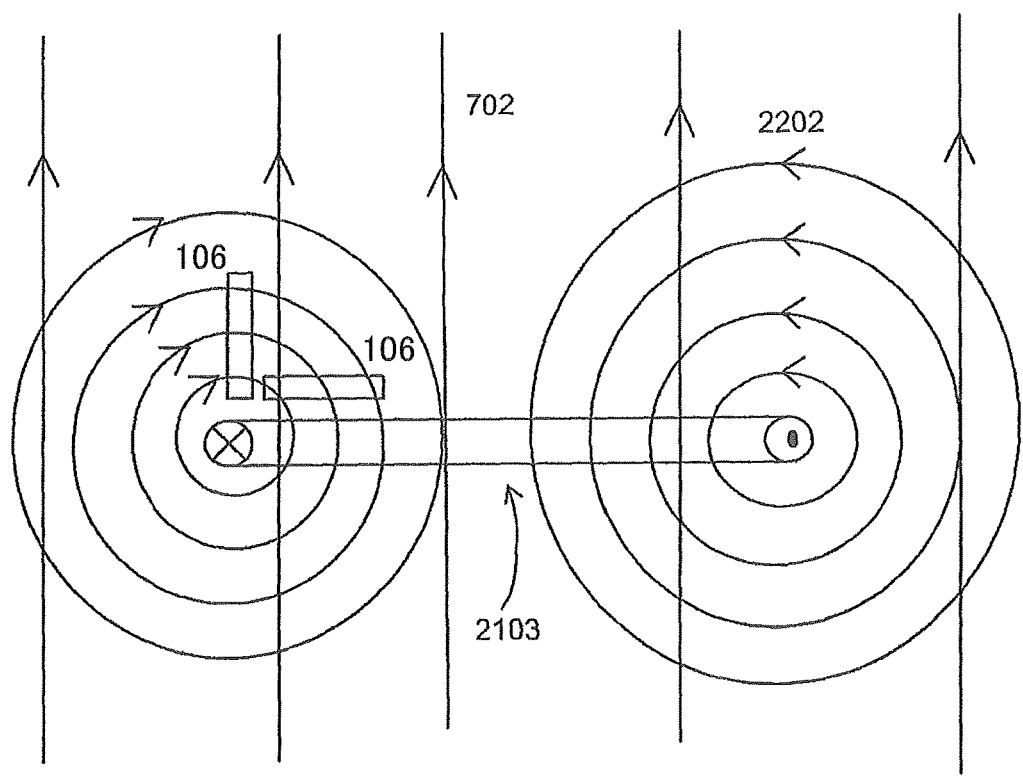
FIG. 22 illustrates, in cross section, the magnetic fields associated with the embodiment of the invention shown in FIG. 21A.

FIG. 22 illustrates, in cross section, the magnetic fields 702 and 2202 associated with the embodiment of the invention coupling device 2103 shown in FIG. 21A. Device 2103 is illustrated to be permeated by a magnetic field 702. The resonant current in the coil 2101 of the device 2103 generates a strong local magnetic field 2202 which will couple to a tag 106 placed close to the device 2103 and oriented to intercept the field 2202. Example locations of the tag 106 which provide suitable coupling are shown. However, such example locations should not be understood as a limitation to the present invention.

Figure 23A:
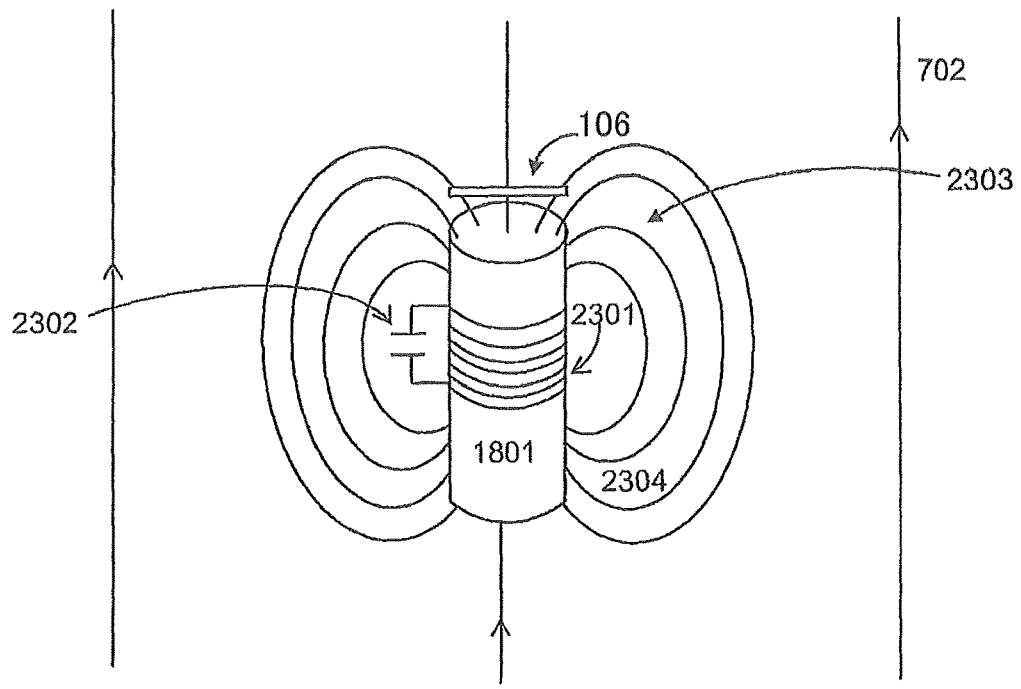
FIGS. 23A and 23B illustrate an embodiment of the invention implemented as a tuned device coupled with a ferrite rod and a corresponding schematic circuit.
Figure 23B:
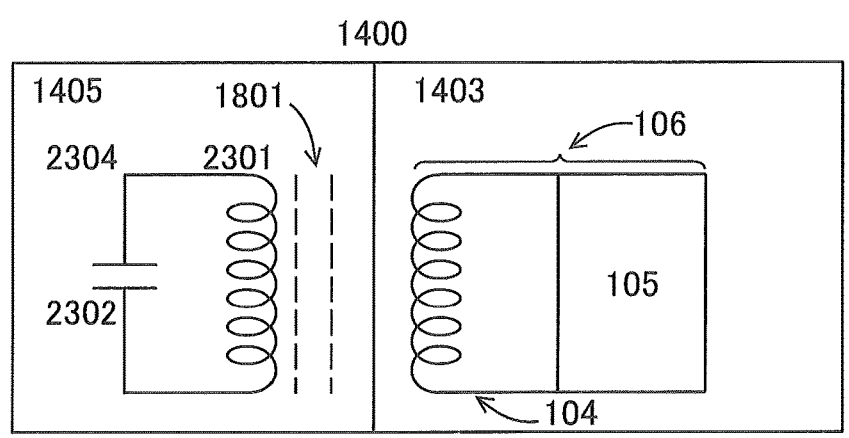

FIGS. 23A and 23B illustrate an embodiment 2304 of the invention implemented as a tuned device coupled with a ferrite rod and a corresponding schematic circuit.

FIG. 23A illustrates an embodiment of the invention implemented as a tuned coupling device 2304. The tuned coupling device 2304 includes a coil 2301 wrapped around an unscreened ferrite rod 1801 and a tuning capacitor 2302. The device 2304 is permeated by a magnetic field 702. The resonant current in the coil 2301 generates a strong local magnetic field 2303 which couples to a tag 106 placed close to ferrite rod 1801 and oriented to intercept the field 2303. An example location of the tag 106 which provides suitable coupling is shown. Other positions are possible as shown by way of example by FIGS. 20A and 20B. The magnetic field leakage along the ferrite rod 1801 of embodiment 2304 makes a shorter length rod advantageous for such an unscreened rod, thereby optimizing the performance of the RFID tag 106.

FIG. 23B illustrates a schematic circuit for the invention shown in FIG. 23A wherein the tag is in the form of the long range second mode tag 1400 formed by bringing together the coupling device 1405 and the first mode tag 1403. The coupling device 1405 is a tuned coupling device 2304 consisting of coil 2301. Coil 2301 is wound on ferrite rod 1801 and with tuning capacitor 2302 forms a tuned circuit. The coil 2301 and ferrite rod 1801 couple to the coil 104 of the RFID tag 106, thereby optimizing the performance of the RFID tag 106 in the first mode tag 1403.

Figure 24C:
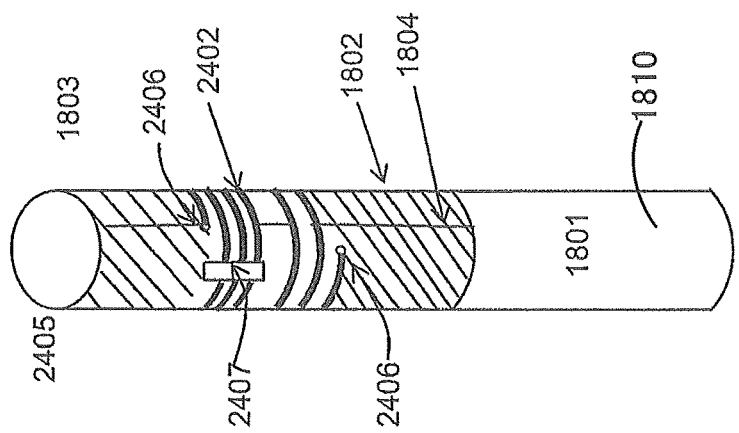
FIGS. 24A, 24B and 24C illustrate an embodiment of the invention implemented as a tuned device coupled with a screened relatively long high permeability rod.
Figure 24B:
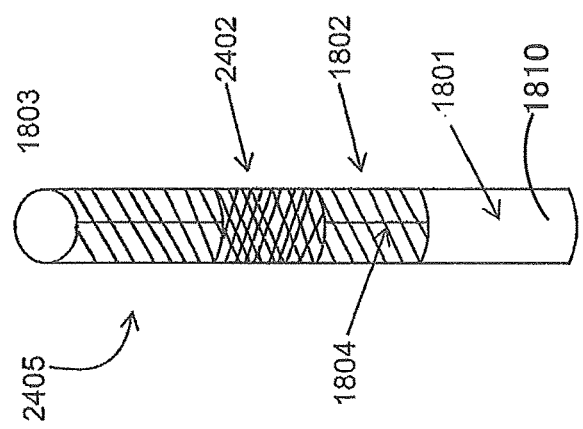
Figure 24A:
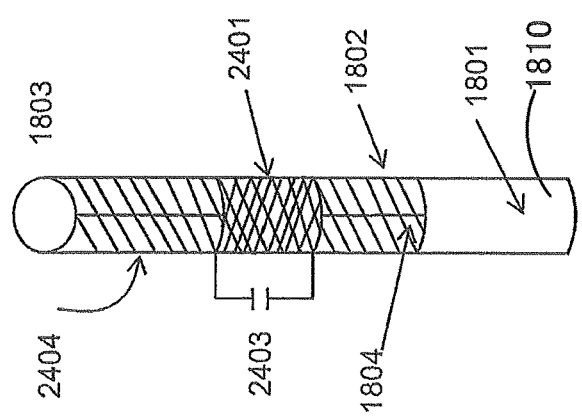

FIGS. 24A, 24B and 24C illustrate embodiments 2404 and 2405 of the coupling device 1405 implemented as a tuned device coupled with a screened long high permeability rod.

FIG. 24A illustrates an embodiment 2404 of the coupling device 1405 implemented as a tuned device which includes a tuning capacitor 2403 connected to a coil 2401, which is wrapped around a screened ferrite rod 1803. The screening 1802 of the screened rod 1803 is overlapped 1804 (referred to as "overlapped type" having overlap region 1804 as shown in FIGS. 18B and 19A) in order to prevent the rod's 1803 internal field from leaking out, along the length of the rod 1801, through the overlap 1804. At the bottom of the rod 1801, or at the unscreened portion 1810, the local magnetic field 702 is concentrated into the rod 1801 where upon the field cannot exit until it reaches the top of the rod 1801. There is no loss of field along the rod's 1801 length along the screen 1802. The tuned elements 2401 and 2403 magnify the rod's 1801 internal field, and the field at the top of the rod 1801 is substantially higher than it would be without the tuned elements. This allows for an optimization of the performance of an RFID tag 106 placed at or near the top of the embodiment 2404.

FIG. 24B illustrates an embodiment 2405 of the coupling device 1405 implemented as a tuned device including a coil 2402 wrapped around a screened ferrite rod 1803. The screening 1802 of the screened rod 1803 is overlapped 1804 in order to prevent the rod's 1801 internal field from leaking out, along the length of the rod 1801, through the overlap 1804. It will be understood by the persons skilled in the art that there will be an existence of stray capacitance between the coil 2402 and the screen 1802, which is able to tune the coil 2402 to resonance. At the bottom of the rod 1801, or at the unscreened portion 1810, the local magnetic field 702 is concentrated into the rod 1801 where upon the field cannot exit until it reaches the top of the rod 1801. There is no loss of field along the rod's 1803 length. The tuned element 2402 magnifies the rod's 1801 internal field such that the field at the top of the rod 1801 is substantially higher than it would be without the tuned element. This allows for an optimization of the performance of an RFID tag 106 placed at or near the top of the embodiment 2405.

FIG. 24C shows the embodiment 2405 in detail. A coil 2402 is wound on the screened ferrite rod 1803. The screen 1802 is wound on a ferrite rod 1801 and overlapped 1804 in order to prevent the rod's 1801 internal field from leaking out, along the length of the rod 1801, through the overlap 1804. For clarity purposes, the overlap 1804 is shown as a line. The ends 2406 of the coil 2402 are open circuited. It will be understood to the persons skilled in the art that in this manner, the coil 2402 is tuned by the stray capacitance between the coil 2402 and the screen 1802. In case the stray capacitance is not enough and if additional tuning capacitance is required, a small plate 2407 of conductive material, such as an aluminium tape, can added to the surface of the coil 2402 to add additional capacitance to the coil 2402.

The method and arrangement shown in FIG. 24C reduces the construction cost and complexity by eliminating the tuning capacitor 2403 and the associated electrical connection, and mechanical attachment and mounting required for capacitor 2403. This reduces the overall cost for the tuning circuit, thereby making the tuning device inexpensive.

Figure 25A:
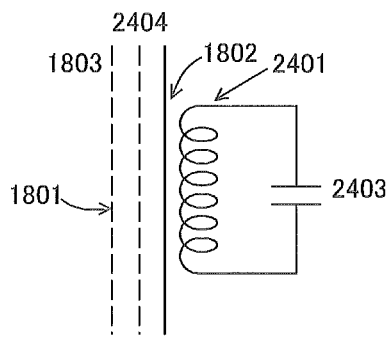
FIGS. 25A, 25B, 25C and 25D illustrate schematic circuits for the embodiment of the invention shown in FIGS. 24A and 24B.
Figure 25B:
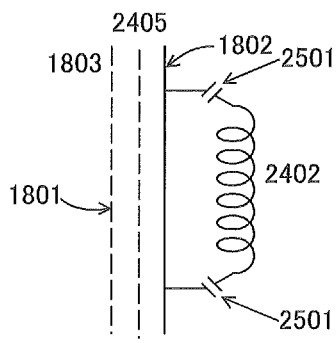

FIGS. 25A and 25B illustrate schematic circuits for the embodiments of the coupling devices 2404 and 2405 shown in FIGS. 24A, 24B and 24C.

FIG. 25A illustrates a schematic circuit for the coupling device 2404 shown in FIG. 24A. Coil 2401 is wound on a screened ferrite rod 1803 which includes a ferrite rod 1801 and a screen 1802. Tuning capacitor 2403 connected to the coil 2401 forms a tuned circuit.

FIG. 25B illustrates a schematic circuit for the coupling device 2405 shown in FIGS. 24B and 24C. Coil 2402 is wound on a screened ferrite rod 1803 which includes a ferrite rod 1801 and a screen 1802. The stray capacitances 2501 between the coil 2402 and the screen 1802 form a tuned circuit.

It should be noted that the optimum resonant frequency for tuned coupling devices may or may not be the same as the operating frequency. For example, the resonance frequency may be chosen to preferentially enhance a weak tag reply signal rather than the interrogation field.

Figure 25C:
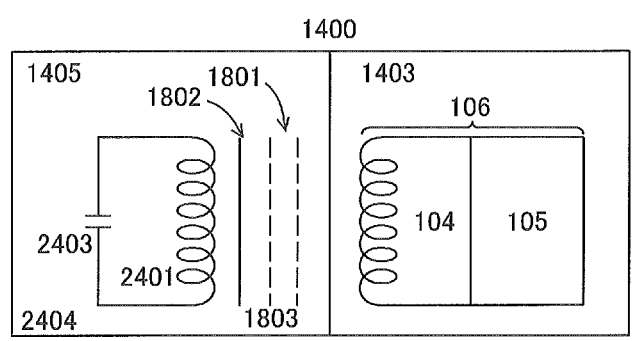
Figure 25D:
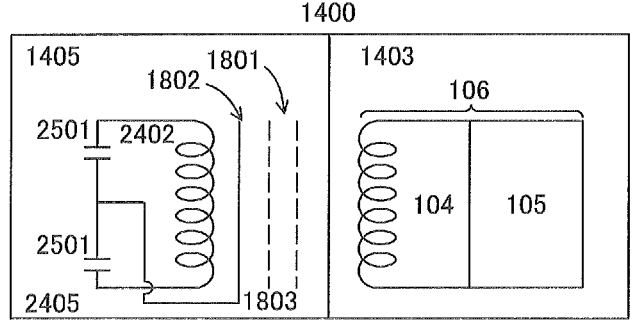

FIGS. 25C and 25D illustrate schematic circuits for the embodiments of the coupling devices 2404 and 2405 shown in FIGS. 24A, 24B and 24C when coupled to a short range first mode tag 1403 in order to form a second mode long range tag 1400.

FIG. 25C illustrates a schematic circuit for the coupling device 2404 shown in FIG. 25A when proximate to a first mode tag 1403 in order to form a long range second mode tag 1400. The coupling device 1405 consists of the tuned coupling device 2404 formed by the tuned circuit consisting of coil 2401 wound on the screened ferrite rod 1803. The screened ferrite rod includes a ferrite rod 1801 and a screen 1802 with an overlap 1804 in order to confine the field inside the ferrite rod 1801. Tuning capacitor 2403 connected to the coil 2401 forms a tuned circuit. The coil 2301 inductively couples through the ferrite rod 1801 to the coil 104 of the RFID tag 106 in the first mode tag 1403 inducing an enhanced interrogation signal in the tag coil 104. The tag chip 105 is connected to the coil 104.

FIG. 25D illustrates a schematic circuit for the coupling device 2405 shown in FIG. 25B when proximate to a first mode tag 1403 in order to form a long range second mode tag 1400. The coupling device 1405 consists of the tuned coupling device 2405 formed by the tuned circuit consisting of coil 2402 wound on the screened ferrite rod 1803. The screened ferrite rod includes a ferrite rod 1801 and a screen 1802 with an overlap 1804 in order to confine the field inside the ferrite rod 1801. The stray capacitances 2501 between the coil 2402 and the screen 1802 form a tuned circuit. The coil 2302 inductively couples through the ferrite rod 1801 to the coil 104 of the RFID tag 106 in the first mode tag 1403 inducing an enhanced interrogation signal in the tag coil 104. The tag chip 105 is connected to the coil 104.

Figure 4A:
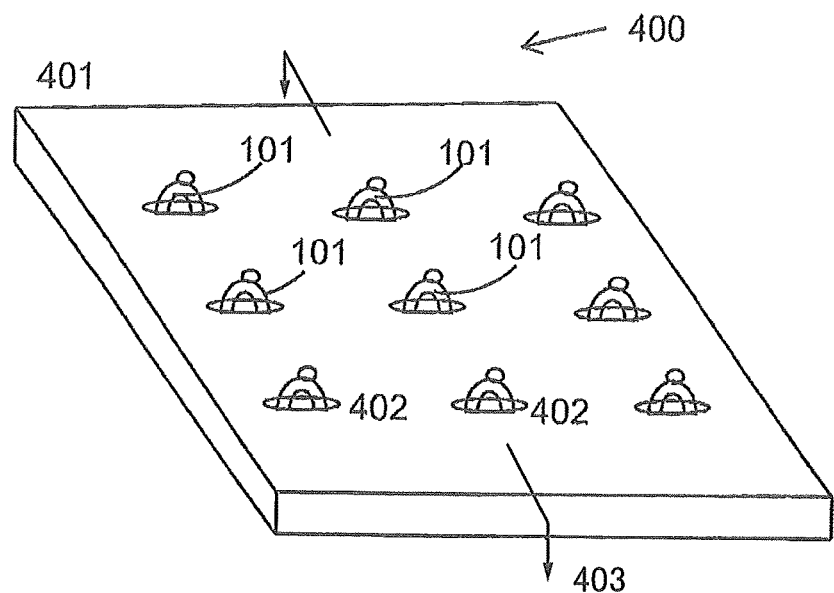
FIGS. 4A and 4B illustrate a ring display tray as a third example application to which the present invention may be applied.
Figure 4B:
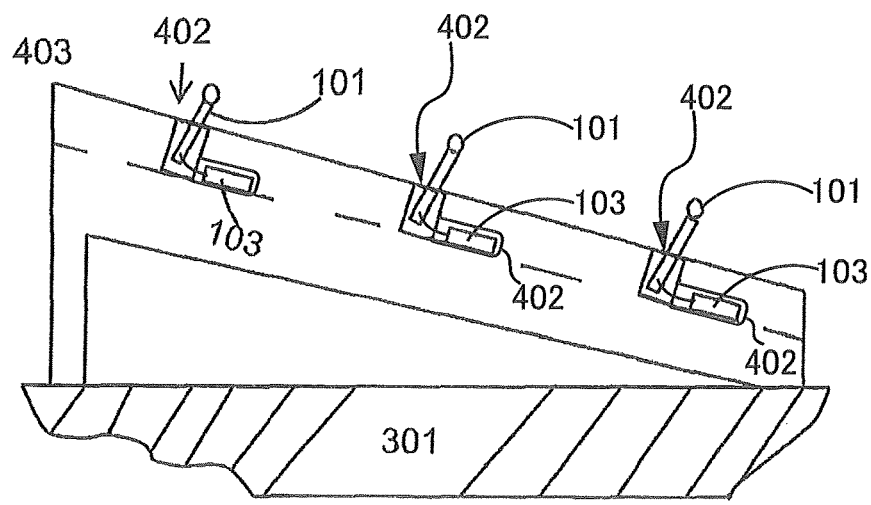
Figure 5A:
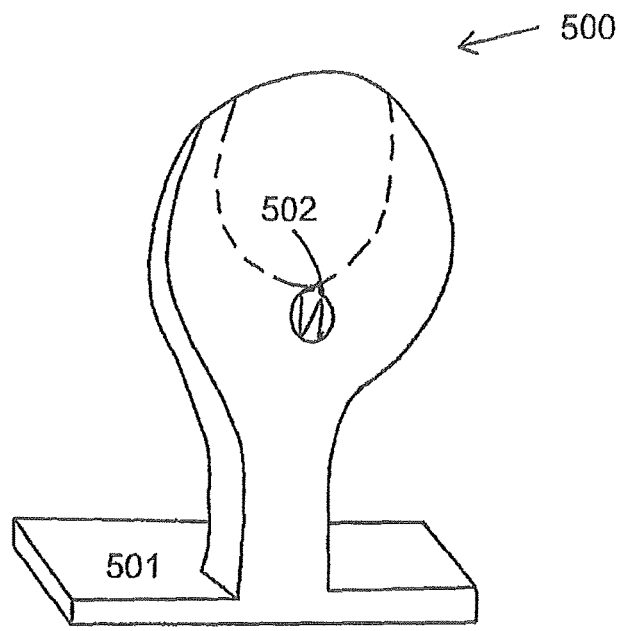
FIGS. 5A and 5B illustrate a necklace stand as a fourth example application to which the present invention may be applied.
Figure 5B:
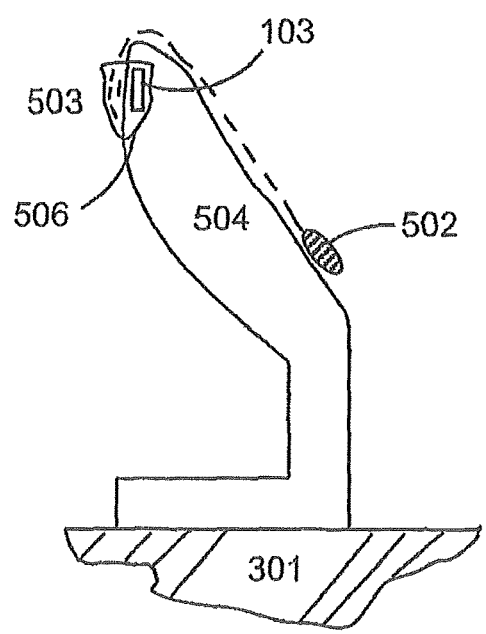
Figure 6A:
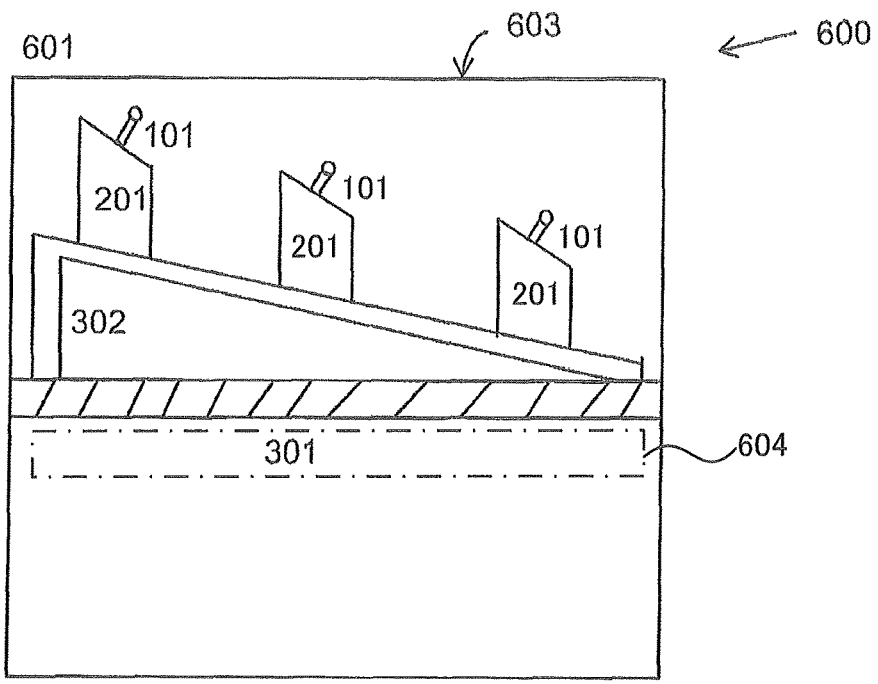
FIGS. 6A and 6B illustrate display cabinets with various mounts, trays and stands as a fifth example application to which the present invention may be applied.
Figure 6B:
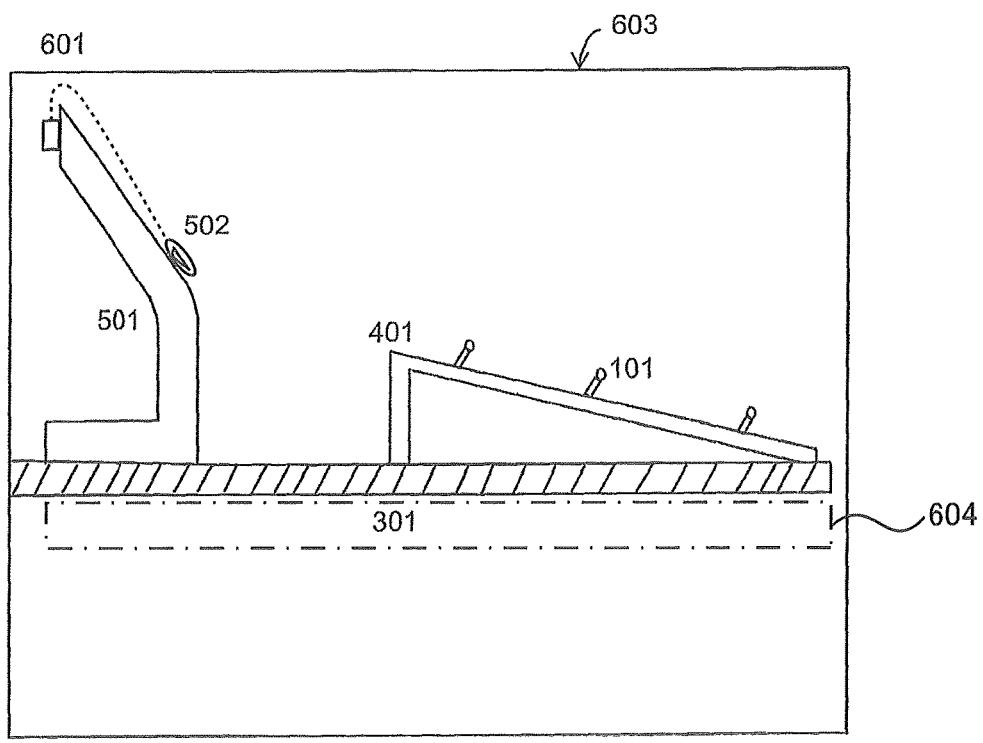
Figure 6C:
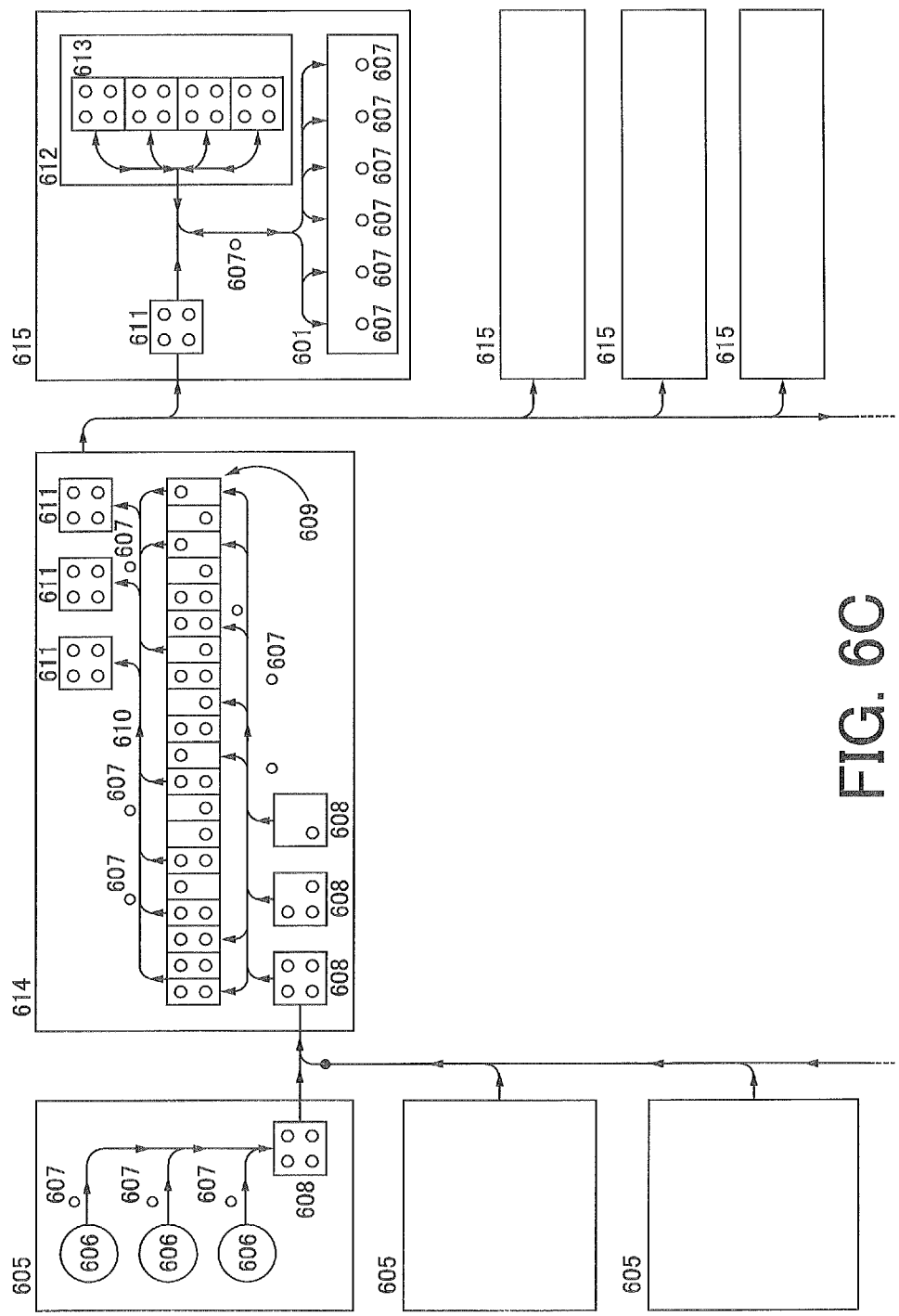
FIG. 6C illustrates an example process flow for a jewelry business.
Figure 26:
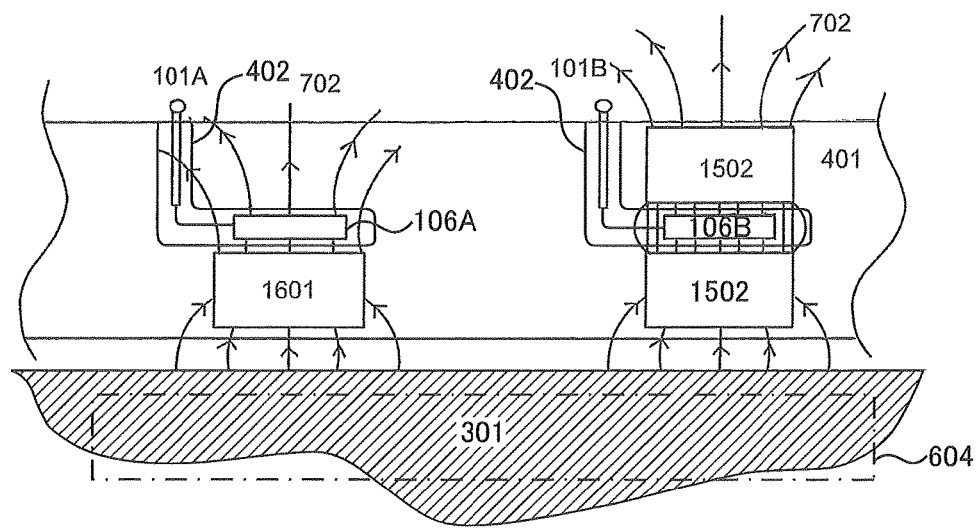
FIG. 26 illustrates various embodiments of an aspect of the present invention as applied to a display tray.

FIGS. 26-30 show the invention in use. In FIG. 26 there is shown various embodiments of an aspect of the present invention applied to a display assembly having a display unit, such as a display tray. A cross sectional view of a display unit, such as a display tray 401 (refer to FIG. 4), is shown suspended above a floor of a display cabinet 301. Interrogator antennas 604 in the cabinet 301 floor generate a magnetic field 702. Two rings 101A and 101B, and their respective tags 106A and 106B are shown inserted in the pocket 402 of the tray 401. The first ring 101A has a single short ferrite rod 1601 positioned to provide an enhancement of the magnetic field 702 where the ring's tag 106A is placed above the rod 1601 as shown in FIG. 26. The second ring 101B has two short ferrite rods 1502 to provide an enhanced magnetic field 702 where the ring's tag 106B is positioned between them, as shown.

Figure 27:
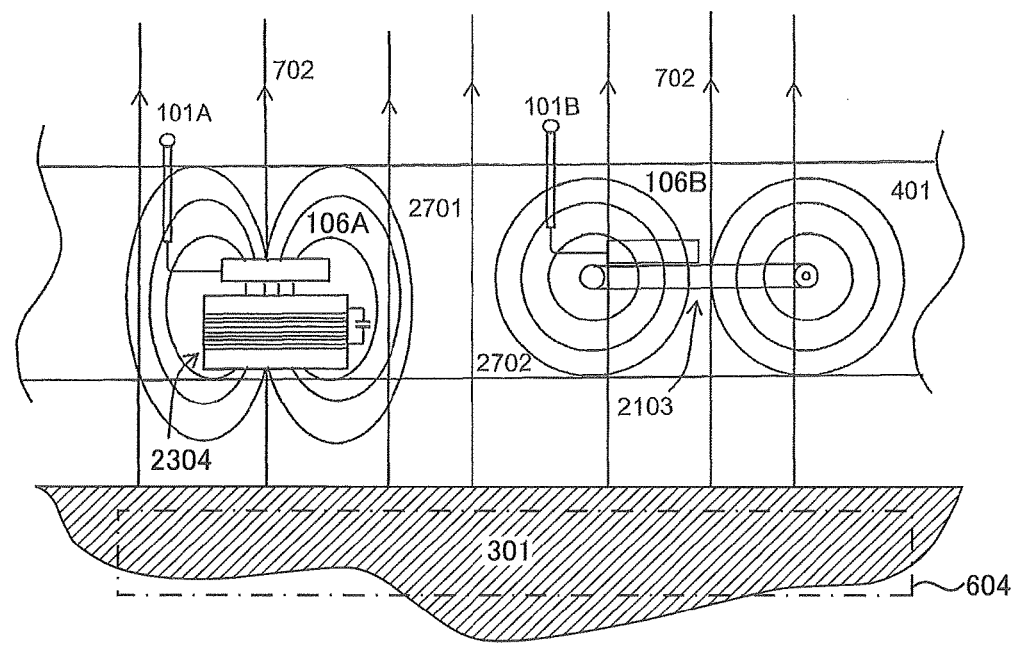
FIG. 27 illustrates further various embodiments of an aspect of the invention as applied to a display tray.

FIG. 27 illustrates various embodiments of an aspect of the invention applied to a display assembly having a display unit, such as a display tray 401. A cross sectional view of the display unit, which is a display tray 401, is shown. The tray 401 is suspended above a floor of the display cabinet 301. Interrogator antennas 604 in the floor of the cabinet 301 generate a magnetic field 702. Two rings 101A and 101B and their respective tags 106A and 106B are shown inserted in the pocket of the tray 401. The first ring 101A has a tuned device 2304 (illustrated in FIG. 23A) positioned to provide an enhanced magnetic field 2701 where the ring's tag 106A is placed above the device 2304 as shown. The second ring 101B has an air cored tuned device 2103 (illustrated in FIG. 21A) positioned to provide an enhanced magnetic field 2702 where the ring's tag 106B is placed proximate the device 2103 as shown. This allows the tags 106A and 106B to face an enhanced magnetic field allowing an optimization of their performance.

Figure 28A:
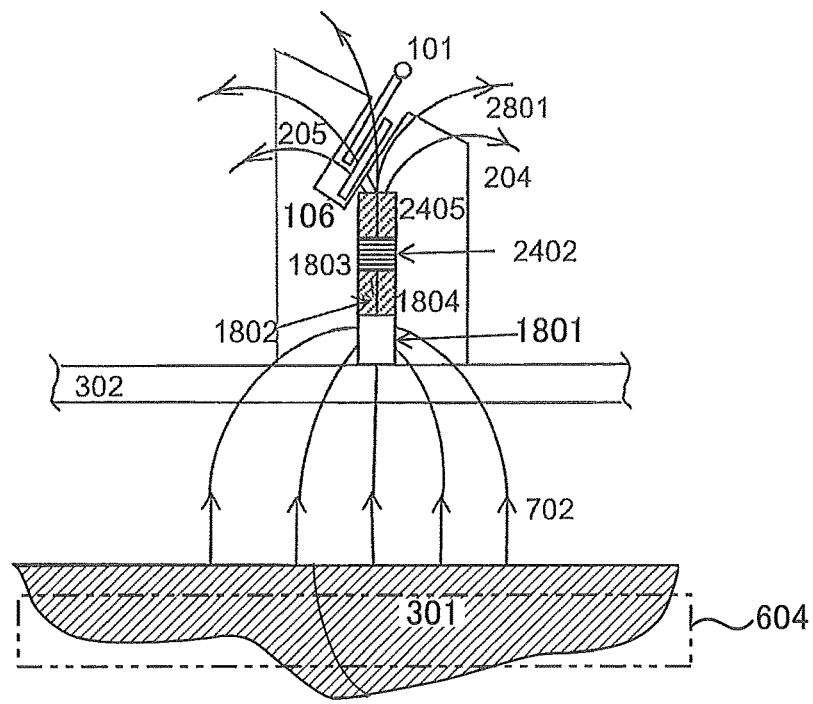
FIGS. 28A and 28B illustrate a third embodiment of an aspect of the present invention as applied to a ring mount and a corresponding schematic circuit.
Figure 28B:
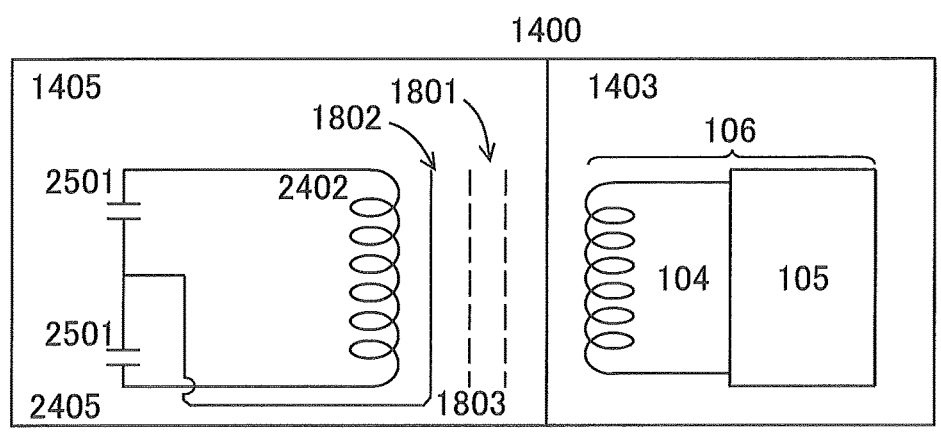

FIGS. 28A and 28B illustrate a third embodiment of an aspect of the present invention applied to a ring mount and a corresponding schematic circuit.

FIG. 28A illustrates a cross sectional view of a display assembly having a display unit, such as a ring mount 204, mounted on a display tray 302 suspended above a floor of the display cabinet 301. Interrogator antennas 604 in the floor of the cabinet 301 generate a magnetic field 702. A ring 101 and its associated tag 106 are shown inserted in the ring mount's pocket 205. The ring mount 204 has a tuned screened ferrite rod 2405 positioned to provide an enhanced magnetic field 2801 where the ring's tag 106 is placed in the pocket 205 as shown. The tuned screened ferrite rod 2405 includes an open ended coil 2402 wound on a screened ferrite rod 1803. The screening material 1802 is wound with an overlap 1804 in order to confine the field inside the ferrite rod 1801. The stray capacitance between the coil 2402 and the screen 1802 tunes the coil 2402 to resonance. Whilst an open ended coil 2402 is described, a discrete tuning capacitor may also be used as illustrated in FIG. 24A.

FIG. 28B illustrates a schematic circuit for the tuned coupling device 2405 and the tag 106 shown in FIG. 28A. A second mode tag 1400 is formed from the coupling device 1405 consisting of tuned coupling device 2405 coupling device 1405 consists of coil 2402 wound on a screened ferrite rod 1803 which includes ferrite rod 1801 and an overlapped screen 1802. The stray capacitances 2501 between the coil 2402 and the screen 1802 form a tuned circuit. The coil 2402 and ferrite rod 1801 inductively couple to the coil 104 of the RFID tag 106 in the first mode tag 1403 inducing an enhanced interrogation signal in the tag coil 104. The tag chip 105 is connected to the coil 104.

Figure 29:
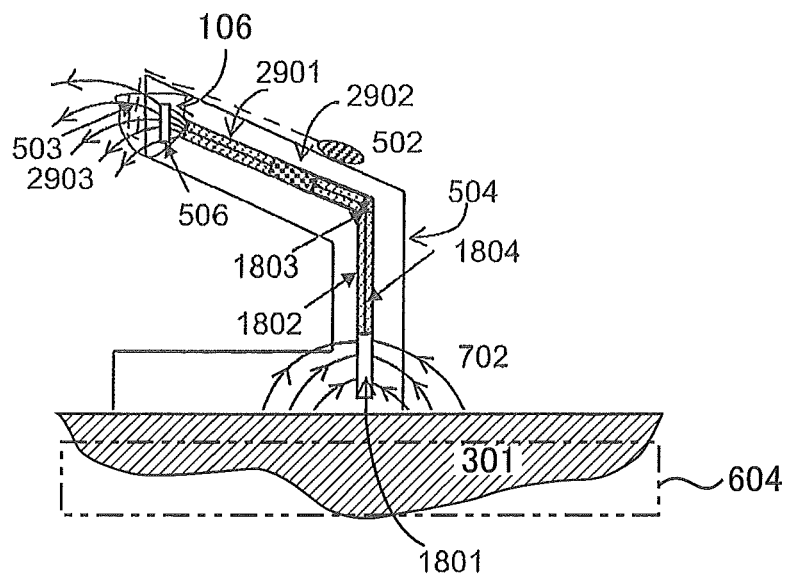
FIG. 29 illustrates yet another embodiment of an aspect of the present invention as applied to a necklace stand.

FIG. 29 illustrates yet another embodiment of an aspect of the present invention applied to a display assembly having a display unit, such as a necklace stand. FIG. 29 illustrates a cross sectional view of a necklace stand 504 mounted on a floor of a display cabinet 301. A necklace 502 is displayed with the excess chain placed in a pouch 503 at the top back of the stand 504. The necklaces tag 106 is located in a pocket 506 at the top back of the stand 504. Interrogator antennas 604 in the cabinet floor 301 generate a magnetic field 702. A tuned screened ferrite rod 2901 is positioned to provide an enhanced magnetic field 2903 where the necklace's tag 106 is placed in the pocket 506. The tuned screened ferrite rod 2901 generally L shaped includes an open ended coil 2902 wound on a screened ferrite rod 1803. The screening material 1802 is wound with an overlap 1804 in order to confine the field inside the ferrite rod 1801. At the bottom of the rod, the local magnetic field 702 is concentrated into the rod 1801 where upon the field cannot exit the rod 1801 until it reaches the top of the rod 1801 where the tag 106 is located. There is no loss of field 702 inside the rod 1801. The ferrite rod 1801 is bent either being made as a bent piece of ferrite or as two separate ferrite rods placed together. The stray capacitance between the coil 2902 and the screen 1802 tunes the coil 2902 to resonance. The tuned coil 2902 magnifies the rod's 1801 internal field and the field at the top of the rod 1801 is substantially higher than it would be without the tuned coil 2902. Whilst an opened ended coil 2902 is described, a discrete tuning capacitor may also be used as illustrated in FIG. 24A. The schematic circuit for this arrangement is shown in FIG. 28B.

Figure 30:
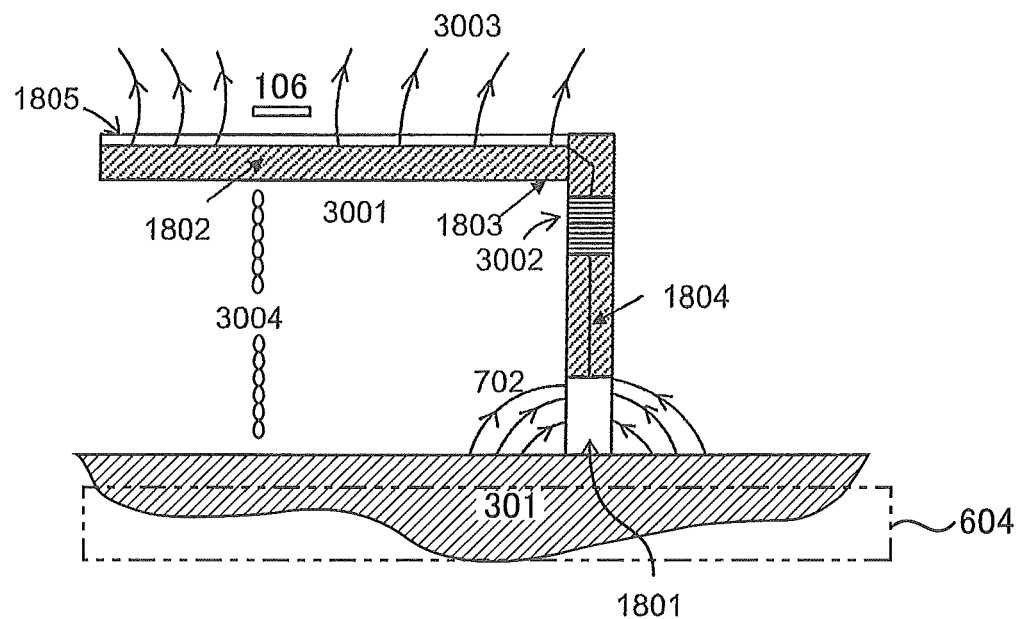
FIG. 30 illustrates still yet another embodiment of an aspect of the present invention as applied to a chain stand.

FIG. 30 illustrates still yet another embodiment of an aspect of the present invention applied to a display unit, such as a chain stand (not shown) on a floor of a display cabinet 301. A chain 3004 is displayed with the chain's tag 106 located at the top of the stand. Interrogator antennas 604 in the floor of the cabinet 301 generate a magnetic field 702. A tuned screened ferrite rod 3001 is positioned to provide an enhanced magnetic field 3003 where the chain tag 106 is located. The tuned screened ferrite rod 3001 includes a resonant open ended coil 3002 wound on a screened ferrite rod 1803. The lower portion screen 1802 of the screened rod 1803 is overlapped 1804 in order to prevent the rod's 1801 internal field from leaking out through the overlap 1804. The upper portion screen 1802 of the screened rod 1803 laterally extending has a gap 1805 in order to allow the rod's 1801 internal field to leak out along the length of the gap 1805. At the bottom of the rod 1801, or at the unscreened portion of the rod, the local magnetic field 702 is concentrated into the rod 1801 where upon the field cannot exit until it reaches the gaped portion 1805 of the rod's 1801 screen. There is no loss of field 702 along the un-gaped portion 1804 of the rod's screen. The ferrite rod 1801 is bent either being made as a bent piece of ferrite or as two separate ferrite rods placed together. The stray capacitance between the coil 3002 and the screen 1802 tunes the coil 3002 to resonance. The tuned coil 3002 magnifies the rod's 1801 internal field and the field at the top of the rod 1801 is substantially higher than it would be without the tuned elements. Whilst an opened ended coil 3002 is described a discrete tuning capacitor may be used as illustrated in FIG. 24A. Such a tuned screened ferrite rod 3001 allows an amplification of the magnetic field in situations where the tags are placed in an irregular orientation, such as when the axis of such tags 106 are parallel to the axis of the cabinet 301. The schematic circuit for this arrangement is shown in FIG. 28B.

It should be apparent to a person skilled in the art that at least two of the various embodiments of the tuned circuit (coupler) as per the present invention, including but not limited to, the embodiments disclosed in FIGS. 14A, 14B, 15A, 15B, 16, 17A, 17B, 17C, 18A, 18B, 18C, 19A, 19B, 20A, 21A, 21B, 22, 23A, 23B, 24A, 24B, 24C, 25A, 25B, 25C and 25D may be combined, for providing the tuning circuit for enhancing the coupling between the at least one RFID tag 106 and an associated interrogator antenna in the present invention.

For example, in an aspect of the present invention, the air cored tune circuit 2103 may be combined with at least one of the permeable rods 1501, 1502, 1601, 1801 (screened or unscreened), screened rod 1803 (overlapped or gaped), and ferrite rod (screened or unscreened) tuned circuit 2304, 2404, and 2405, as envisaged, to provide the enhancement in coupling as envisaged by the present invention.

In another aspects, one or more of the permeable rods 1501, 1502, 1601, 1801 (screened or unscreened), screened rod 1803 (overlapped or gaped), may be used with the ferrite rod (screened or unscreened) tuned circuit 2304, 2404, and 2405, to provide the enhancement in coupling as envisaged by the present invention.

In another aspects, one or more of the and ferrite rod (screened or unscreened) tuned circuit 2304, 2404, and 2405, may be used with each other, to provide the enhancement in coupling as envisaged by the present invention.

In another aspects, one or more of the permeable rods 1501, 1601, 1801 (screened or unscreened), screened rod 1803 (overlapped or gaped), may be used with each other, to provide the enhancement in coupling as envisaged by the present invention.

It should be understood that the materials as disclosed in the present invention should not be construed as a limitation of the present invention. Accordingly, any permeable material other than ferrite material, capable of modifying the character of the magnetic field may be equally employed in the present invention.

In another aspect, the present invention provides a method for interrogation of at least one RFID tag capable of two modes of operation. Firstly, the method involves configuring an antenna adapted to radiate an interrogation signal. Further, the method involves configuring at least one coupling means positioned proximal to the at least one short range RFID tag. The coupling means is adapted to concentrate the magnetic field and to enhance the coupling between the at least one short range RFID tag and the antenna changing the short range RFID tag to a long range RFID tag. Further, the method involves identifying a coded return signal from the at least one RFID tag.

In yet another aspect, the present invention provides a cabinet for stacking and detecting multiple items. Each of the multiple items attached with a short range RFID tag. The cabinet includes a first part having at least one short range RFID tag attached to each of the multiple items. Further, the cabinet includes an interrogator antenna adapted to radiate an interrogation signal inside the cabinet. Furthermore, the cabinet includes at least one second part capable of operably associating to the first part for interrogation. The at least one second part is adapted to concentrate the magnetic field and to couple the at least one RFID tag and the associated interrogator antenna changing the short range RFID tag to a long range RFID tag.

In yet another aspect, the present invention provides a display assembly. The display assembly includes a display unit capable of receiving one or more items. Each of the one or more items is coupled with a first part having at least one short range RFID tag. Further, the present invention provides an interrogator antenna adapted to radiate an interrogation signal. Furthermore, the present invention provides at least one second part capable of operably associating with the first part for interrogation. The at least one second part is adapted to concentrate a magnetic field of the interrogation signal and to couple the at least one short range RFID tag and the associated interrogator antenna changing the short range RFID tag to a long range RFID tag.

Figure 31:
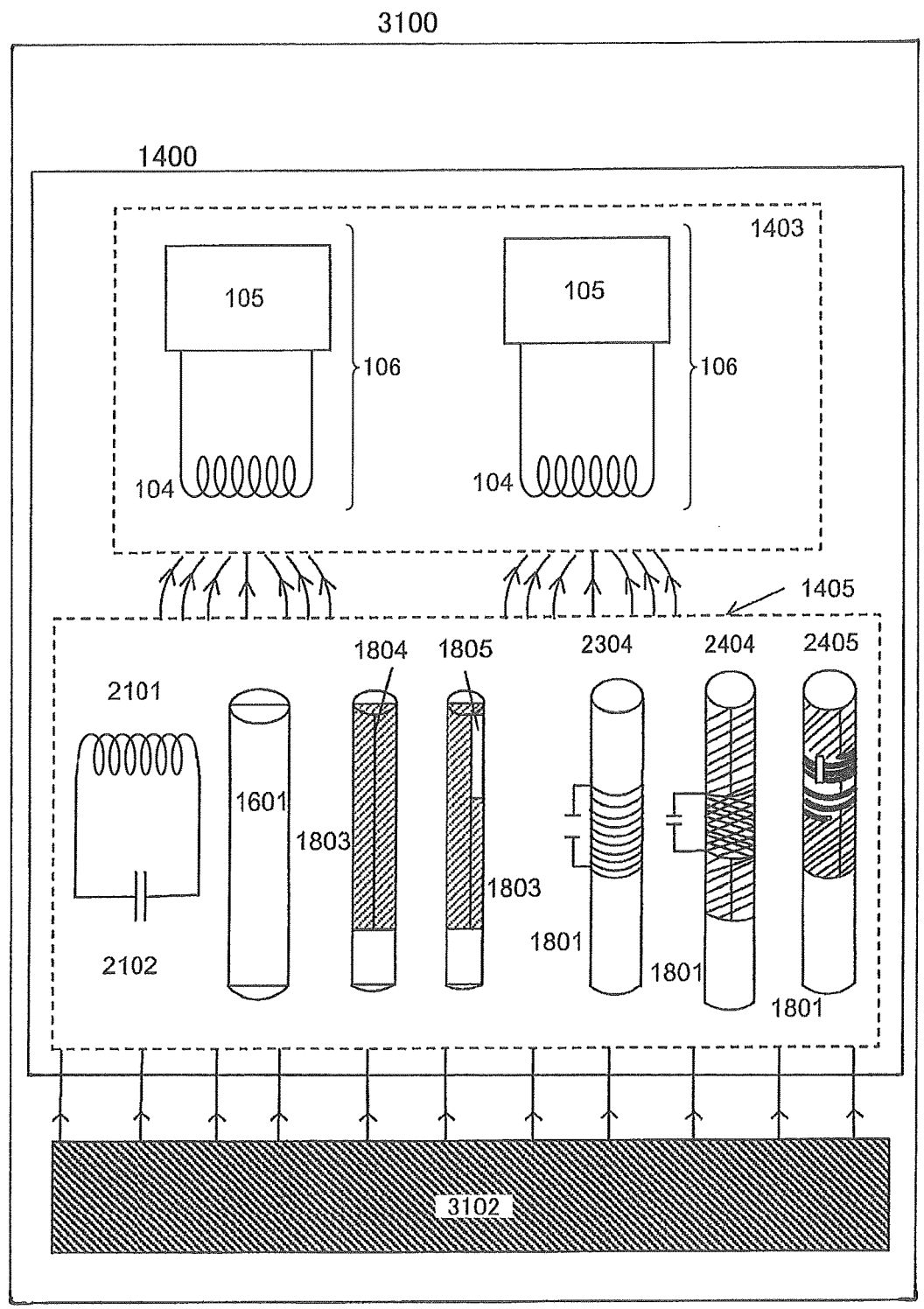
FIG. 31 illustrates various embodiments of the invention implemented as a device consisting of combinations of one or more of the invention elements described.

In yet another aspect, the present invention provides a device 3100, which includes a two part tag RFID tag 1400 consisting of a first part 1403 having at least one RFID tag 106, and a second part 1405 capable of operably associating with the first part 1403 for interrogation as shown in FIG. 31. The second part 1405 includes at least one of the second part as described in various embodiments above. Further, as shown in FIG. 31, the device 3100 includes an interrogator antenna 3102 adapted to radiate an interrogation signal. The at least one second part 1405 is adapted to concentrate magnetic field and to couple the at least one RFID tag 106 and the associated interrogator antenna 3102.

As per various aspects of the present invention, the enhancing means may be employed by providing permeable rod as per any of the embodiments explained with reference to FIGS. 14A-20B, and 23A-24C.

As per various aspects of the present invention, the enhancing means is an air cored tune circuit described with reference to FIGS. 21A and 21B above.

While this invention has been described in connection with specific embodiments thereof, it will be understood that it is capable of further modification(s). This application is intended to cover any variations uses or adaptations of the invention following in general, the principles of the invention and including such departures from the present disclosure as come within known or customary practice within the art to which the invention pertains and as may be applied to the essential features hereinbefore set forth.

As the present invention may be embodied in several forms without departing from the spirit of the essential characteristics of the invention, it should be understood that the above described embodiments are not to limit the present invention unless otherwise specified, but rather should be construed broadly within the spirit and scope of the invention as defined in the appended claims. The described embodiments are to be considered in all respects as illustrative only and not restrictive.

Various modifications and equivalent arrangements are intended to be included within the spirit and scope of the invention and appended claims. Therefore, the specific embodiments are to be understood to be illustrative of the many ways in which the principles of the present invention may be practiced. In the following claims, means-plus-function clauses are intended to cover structures as performing the defined function and not only structural equivalents, but also equivalent structures. For example, although a nail and a screw may not be structural equivalents in that a nail employs a cylindrical surface to secure wooden parts together, whereas a screw employs a helical surface to secure wooden parts together, in the environment of fastening wooden parts, a nail and a screw are equivalent structures.

"Comprises/comprising" and "includes/including" when used in this specification is taken to specify the presence of stated features, integers, steps or components but does not preclude the presence or addition of one or more other features, integers, steps, components or groups thereof. Thus, unless the context clearly requires otherwise, throughout the description and the claims, the words 'comprise', 'comprising', 'includes', 'including' and the like are to be construed in an inclusive sense as opposed to an exclusive or exhaustive sense; that is to say, in the sense of "including, but not limited to".

The invention claimed is:

1. A two part RFID tag system capable of communicating with an interrogator antenna, the two part RFID tag system comprising:
a first part being an RFID tag, and
a second part being a coupling device having a first end and an opposed second end, the coupling device operably associating with the first part for the purpose of interrogation, the coupling device, in operation, being adapted to enhance the magnetic field so as to enhance communication between the first part and an interrogator antenna,
wherein the second part comprises an elongate permeable rod positioned proximal the RFID tag, the permeable rod capable of allowing a magnetic field of the interrogator antenna to pass there-through for enhancing the magnetic field around the RFID tag,
wherein the second part further comprises a conductive screen wrapped at least partially around the permeable rod, the conductive screen adapted to substantially limit leaking of the magnetic field across the length of the permeable rod,
wherein the RFID tag is positioned at the first end of the coupling device and the coupling device is configured to route communication between the RFID tag and the interrogator antenna when placed in proximity to the opposed second end, and
wherein the coupling device is external to the RFID tag.

2. The two part RFID tag system as claimed in claim 1, wherein the conductive screen comprises an overlap region formed by overlapping of edges of the conductive screen, the overlap region adapted to limit the magnetic field leaking out across the length of the permeable rod.

3. The two part RFID tag system as claimed in claim 1, wherein the conductive screen has a gap region formed by providing a gap between edges of the conductive screen, the gap region allowing the magnetic field to partially leak out from the gap region of the permeable rod.

4. The two part RFID tag system as claimed in claim 1, wherein the permeable rod is a ferrite rod.

5. A coupling device for use in electromagnetically coupling an RFID tag to an interrogator antenna, the coupling device comprising:
an elongate permeable member having a pair of opposed ends and being configured to route communication between the RFID tag when placed proximate a first end of the permeable member and the interrogator antenna when placed in proximity to an opposed second end; and
a conductive screen wrapped at least partially around the permeable member, the conductive screen being configured to constrain passage of a magnetic field within the permeable member.

6. The coupling device of claim 5, wherein the conductive screen at least partially screens a surface area of the permeable member to leave an ingress area and an egress area of the permeable member unexposed so that the magnetic field, having entered the permeable member at the ingress area, is guided to leave the permeable member at the egress area towards a tag antenna.

7. The coupling device of claim 6, wherein the conductive screen has an overlap region formed by overlapping edges of the conductive screen, the overlap region being configured to limit leaking of the magnetic field from the permeable member.

8. The coupling device of claim 5, wherein the conductive screen has an overlap region formed by overlapping edges of the conductive screen, the overlap region being configured to limit leaking of the magnetic field from the permeable member.

9. The coupling device of claim 5, wherein the permeable member comprises one or more ferrite members.

10. The coupling device of claim 9, wherein the one or more ferrite members are arranged along a path from an interrogator antenna towards an RFID tag so as to guide the magnetic field from the interrogator antenna to the RFID tag.

11. The coupling device of claim 10, wherein the path is a three dimensional path.

12. An RFID reader, comprising:
an interrogator antenna; and
a coupling device comprising:
an elongate permeable member having a pair of opposed ends and being configured to communicate with the RFID tag when placed proximate a first end of the permeable member; and a conductive screen wrapped at least partially around the permeable member, the conductive screen configured to constrain passage of a magnetic field within the permeable member.

13. An RFID reader, comprising:
an interrogator antenna; and
a coupling device comprising:
- an elongate permeable member having a pair of opposed ends and being configured to communicate with the RFID tag when placed proximate a first end of the permeable member; and
- a conductive screen that at least partially screens a surface area of the permeable member to leave an ingress area and an egress area of the permeable member unexposed so that a magnetic field that enters the permeable member at the ingress area is guided to leave the permeable member at the egress area towards a tag antenna.

14. A method, comprising:
providing an RFID reader according to claim 13, and
the permeable rod of the coupling device guiding the magnetic field of the interrogator antenna towards the tag antenna and enhancing the magnetic field around the tag antenna.

* * * * *